(12) United States Patent
Nishina et al.

(10) Patent No.: US 7,624,345 B2
(45) Date of Patent: *Nov. 24, 2009

(54) APPARATUS AND METHOD FOR CONTROLLING DISPLAY OF ELECTRICAL PROGRAM GUIDE

(75) Inventors: Yasutomo Nishina, Chiba (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 400 days.

This patent is subject to a terminal disclaimer.

(21) Appl. No.: 11/087,131

(22) Filed: Mar. 23, 2005

(65) Prior Publication Data

US 2005/0166236 A1    Jul. 28, 2005

Related U.S. Application Data

(63) Continuation of application No. 09/217,117, filed on Dec. 21, 1998, now Pat. No. 6,957,386, which is a continuation of application No. 08/893,878, filed on Jul. 11, 1997, now Pat. No. 5,909,212.

(30) Foreign Application Priority Data

Jul. 26, 1996  (JP)  .................................. 08-214073

(51) Int. Cl.
   *G06F 3/00*   (2006.01)
   *G06F 13/00*  (2006.01)
   *H04N 5/445*  (2006.01)
(52) U.S. Cl. ....................... 715/716; 715/719; 715/723; 725/39; 725/40; 725/43; 348/563; 348/564
(58) Field of Classification Search ................. 715/716, 715/719, 723; 725/39, 40, 43, 52; 348/563, 348/564
See application file for complete search history.

(56) References Cited

U.S. PATENT DOCUMENTS 5,047,867 A * 9/1991 Strubbe et al. ................ 386/83

(Continued)

FOREIGN PATENT DOCUMENTS

JP    2-189753    7/1990

(Continued)

OTHER PUBLICATIONS

Patent Abstract of Japan, abstract of JP 07-16277, publication date Jun. 23, 1995, entitled "Electronic Program Guiding Device," (Toshiba Corp.).

(Continued)

*Primary Examiner*—Tadeese Hailu
(74) *Attorney, Agent, or Firm*—Frommer Lawrence & Haug LLP; William S. Frommer; Ellen Marcie Emas

(57) ABSTRACT

An improved apparatus is provided to attain enhanced convenience in controlling display of an electrical program guide with a smaller number of manipulating keys. An EPN mode for displaying the electrical program guide includes a main mode to display program information in a main window, a command mode to display EPN command icons in a command window, and an input mode to display an input window for entry manipulation corresponding to a specific command item. And the operation is shiftable to any of such modes selected by manipulation of a command key or an EXE key. In the main mode, there is set either a mode to display broadcast program information or a mode to display recorded program information on the basis of tape library data.

6 Claims, 23 Drawing Sheets

MODE TRANSITION IN EMBODIMENT

U.S. PATENT DOCUMENTS

| | | | |
|---|---|---|---|
| 5,153,861 A | | 10/1992 | Maeda et al. |
| 5,291,343 A | * | 3/1994 | Goto .......................... 386/96 |
| 5,390,027 A | * | 2/1995 | Henmi et al. ................. 386/65 |
| 5,436,676 A | * | 7/1995 | Pint et al. .................... 348/734 |
| 5,479,268 A | * | 12/1995 | Young et al. ................. 386/83 |
| 5,502,504 A | | 3/1996 | Marshall et al. |
| 5,528,304 A | | 6/1996 | Cherrick et al. |
| 5,532,754 A | * | 7/1996 | Young et al. ................. 725/47 |
| 5,543,929 A | * | 8/1996 | Mankovitz et al. ............ 386/46 |
| 5,550,576 A | * | 8/1996 | Klosterman .................. 725/46 |
| 5,589,892 A | * | 12/1996 | Knee et al. .................... 725/43 |
| 5,594,509 A | * | 1/1997 | Florin et al. .................. 725/43 |
| 5,684,525 A | * | 11/1997 | Klosterman .................. 725/48 |
| 5,692,214 A | * | 11/1997 | Levine ........................ 710/13 |
| 5,726,702 A | * | 3/1998 | Hamaguchi et al. ........... 725/55 |
| 5,754,257 A | * | 5/1998 | Lee ............................. 348/731 |
| 5,778,181 A | | 7/1998 | Hidary et al. |
| 5,805,763 A | * | 9/1998 | Lawler et al. ................. 386/83 |
| 5,808,694 A | * | 9/1998 | Usui et al. .................... 725/49 |
| 5,856,852 A | * | 1/1999 | Huh .......................... 348/460 |
| 5,880,768 A | * | 3/1999 | Lemmons et al. ............. 725/41 |
| 5,880,769 A | * | 3/1999 | Nemirofsky et al. ......... 725/139 |
| 5,909,212 A | * | 6/1999 | Nishina et al. ................ 725/47 |
| 5,920,842 A | * | 7/1999 | Cooper et al. ............... 704/503 |
| 6,052,145 A | * | 4/2000 | Macrae et al. ................ 725/50 |
| 6,147,715 A | * | 11/2000 | Yuen et al. ................... 348/565 |
| 6,289,170 B1 | * | 9/2001 | Nagano et al. ................ 386/83 |
| 6,327,109 B1 | | 12/2001 | Kori et al. |
| 6,424,790 B1 | | 7/2002 | Ishii et al. |
| 6,529,680 B1 | * | 3/2003 | Broberg ....................... 386/83 |
| 6,957,386 B2 | * | 10/2005 | Nishina et al. .............. 715/716 |

FOREIGN PATENT DOCUMENTS

| | | |
|---|---|---|
| JP | 6-504165 | 5/1994 |
| JP | 7-162777 | 6/1995 |
| JP | 3885767 | 12/2006 |
| WO | WO 95/32583 | 11/1995 |

OTHER PUBLICATIONS

Patent Abstract of Japan, abstract of JP 07-297794, publication date Nov. 10, 1995, entitled "Automatic Index Device and Automatic Program Searching Device," (Matsushita Electric Ind. Co. LTD.).

* cited by examiner

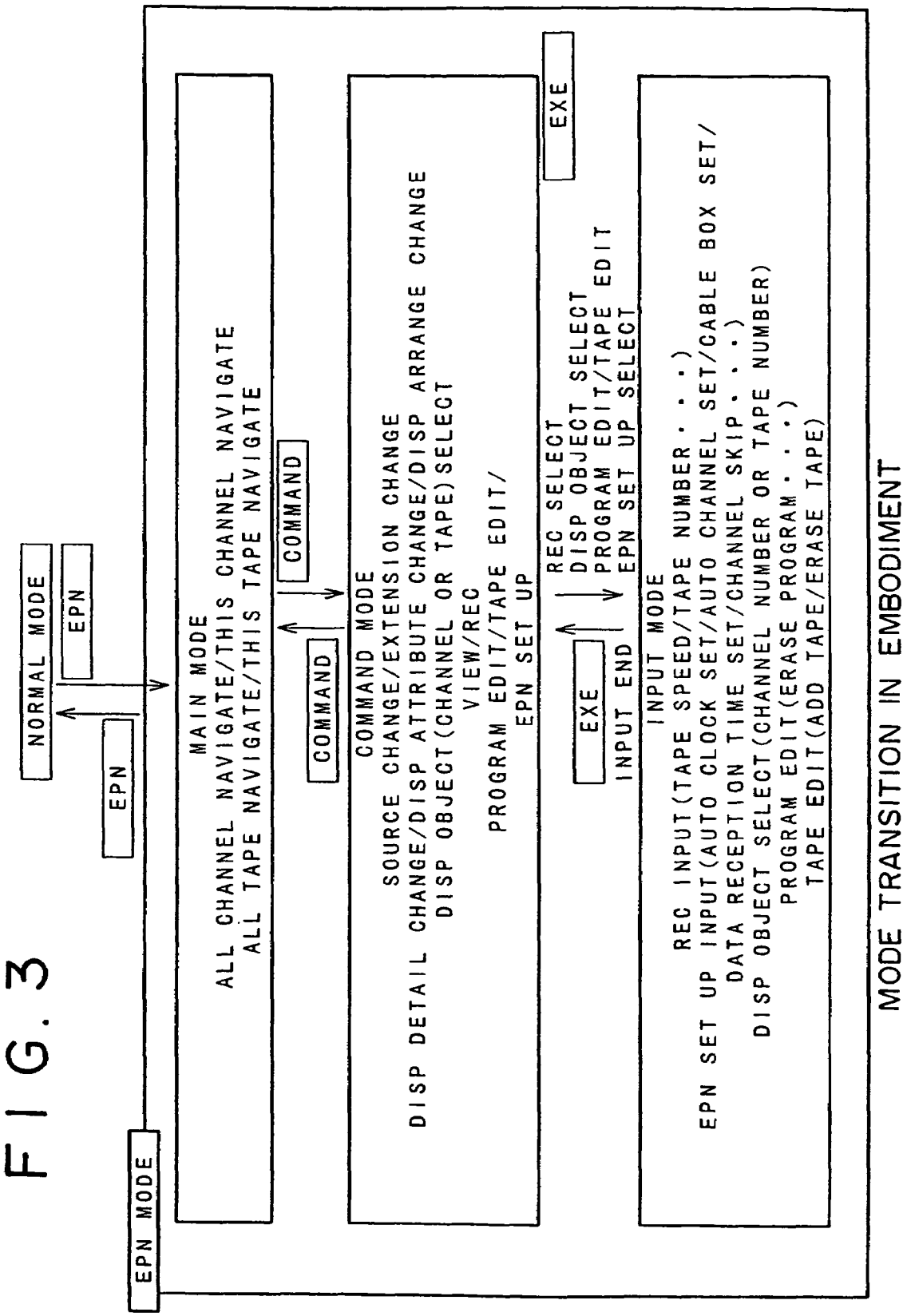
FIG. 3 MODE TRANSITION IN EMBODIMENT

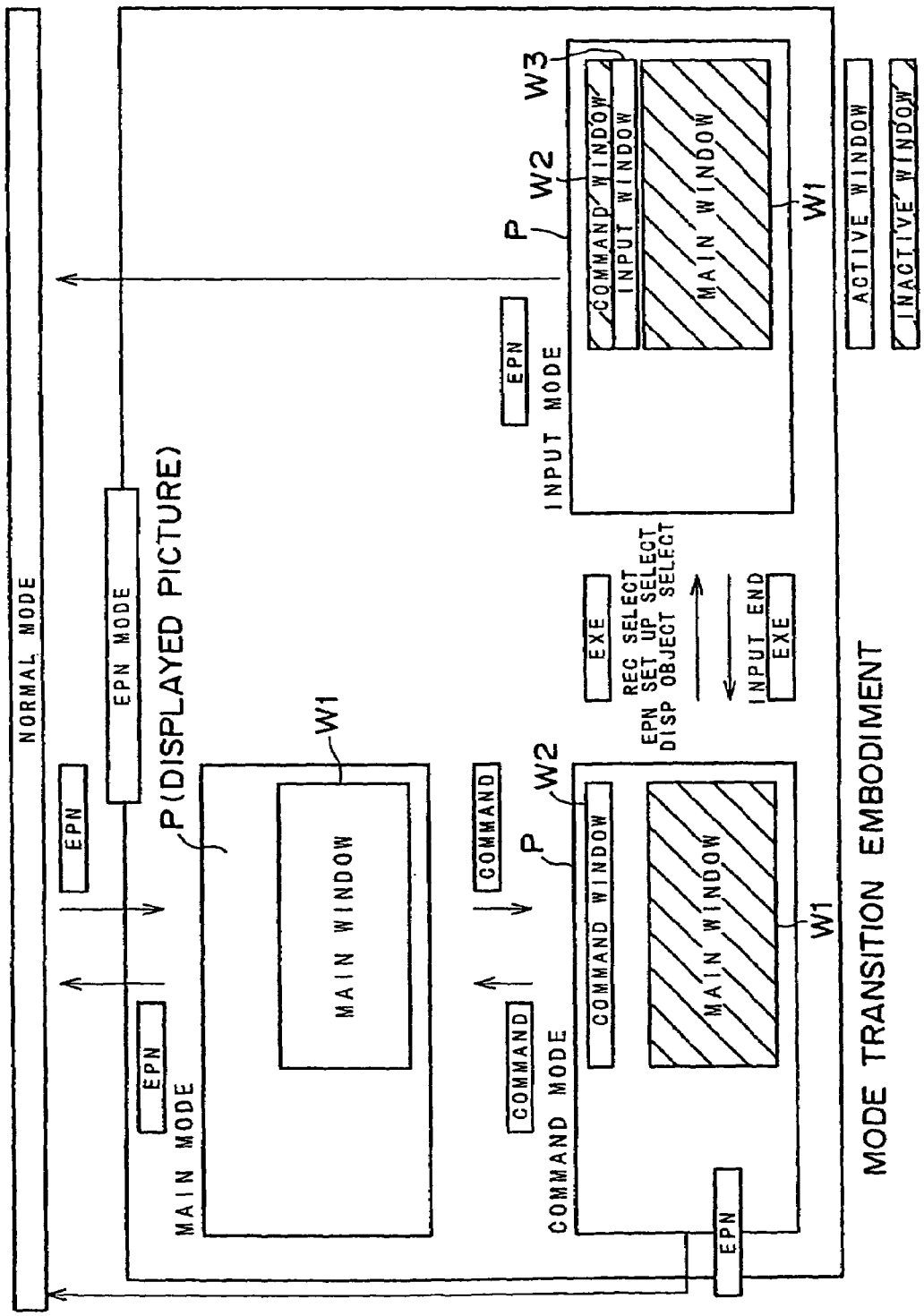

FIG. 5B

CONTENTS OF DEFINITIONS IN MAIN WINDOW

| | | ALL CHANNEL NAVIGATE | THIS CHANNEL NAVIGATE | ALL TAPE NAVIGATE | THIS TAPE NAVIGATE |
|---|---|---|---|---|---|
| STATUS AREA | DISPLAY EPN STATUS | "ALL CHANNEL" | "THIS CHANNEL" | "ALL TAPE" | "THIS TAPE" |
| PROG INFO AREA | DISPLAY INFO OF PROGRAM SELECTED IN LISTING AREA | PROGRAM BROADCAST CHANNEL NO.; PROGRAM START/END TIMES | PROGRAM BROADCAST CHANNEL NO.; PROGRAM START/END TIMES | PROGRAM BROADCAST TAPE NO.; PROGRAM START/END POSITIONS | PROGRAM BROADCAST TAPE NO.; PROGRAM START/END POSITIONS |
| TIME INFO AREA | DISPLAY CURRENT TIME | CURRENT TIME | CURRENT TIME | CURRENT TIME | CURRENT TIME |
| LISTING AREA | DISPLAY PROGRAM INFO (ONE PROGRAM PER ROW) | PROGRAM NAME/LENGTH (OR START TIME); BROADCAST CHANNEL | PROGRAM NAME/LENGTH (OR START TIME) | PROGRAM NAME/LENGTH (OR START POSITION); TAPE NO. | PROGRAM NAME/LENGTH (OR START POSITION); TAPE NO. |
| DETAIL BOX | DISPLAY CONTENT OF PROGRAM SELECTED IN LISTING AREA | 1ST DETAIL | 1ST DETAIL | NON-DISPLAY | NON-DISPLAY |

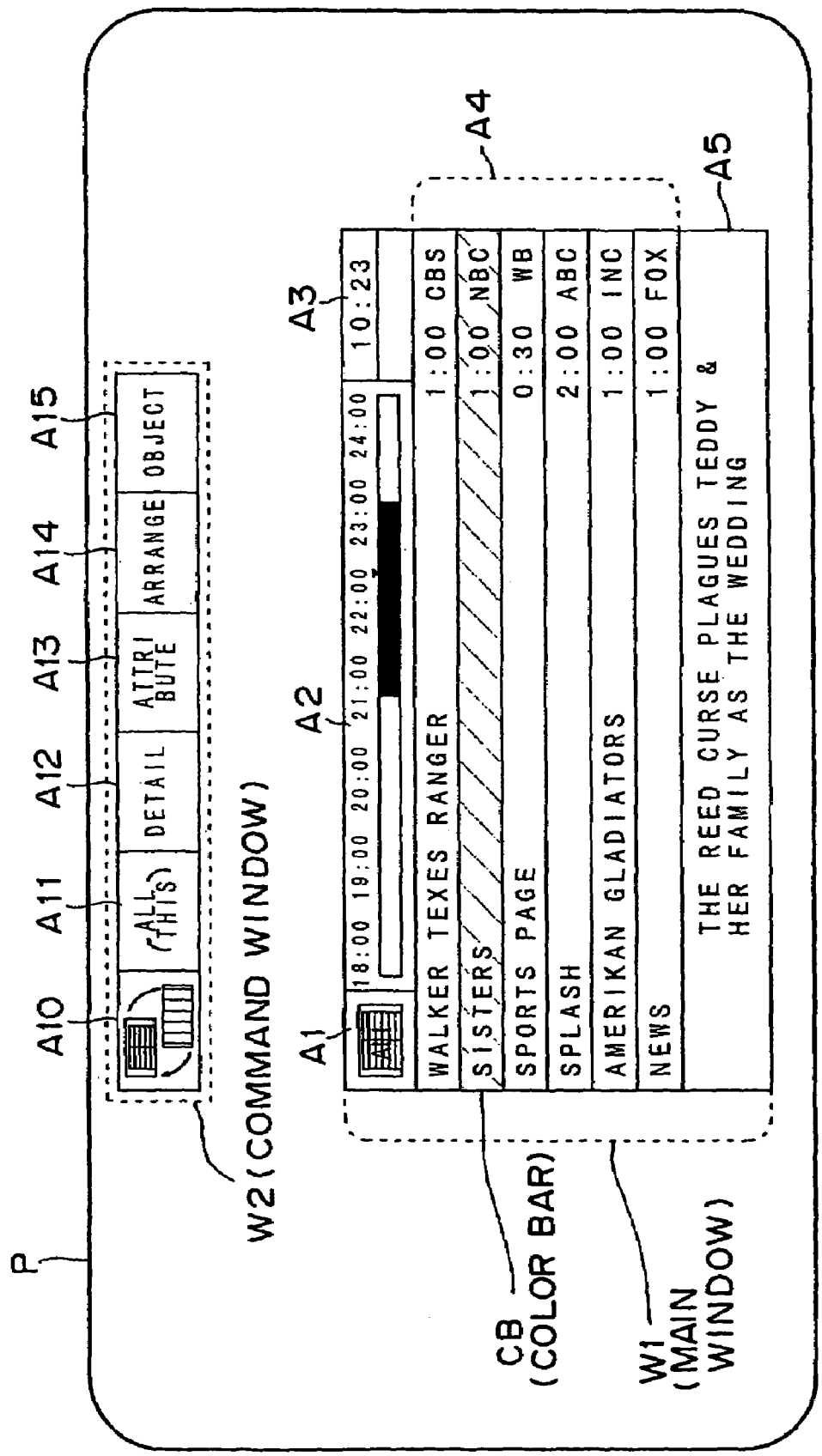

ALL CHANNEL NAVIGATE

THIS CHANNEL NAVIGATE

ALL TAPE NAVIGATE

THIS TAPE NAVIGATE

FIG. 8A

COMMAND_0MODE

| COMMAND_<br>0_0<br>ICON | COMMAND_<br>0_1<br>ICON | COMMAND_<br>0_2<br>ICON | COMMAND_<br>0_3<br>ICON | COMMAND_<br>0_4<br>ICON | COMMAND_<br>0_5<br>ICON | COMMAND_<br>0_6<br>ICON | COMMAND_<br>0_7<br>ICON |
|---|---|---|---|---|---|---|---|
| A10 | A11 | A12 | A13 | A14 | A15 | A16 | A17 |

COMMAND_1MODE

| COMMAND_<br>1_0<br>ICON | COMMAND_<br>1_1<br>ICON | COMMAND_<br>1_2<br>ICON | COMMAND_<br>1_3<br>ICON | COMMAND_<br>1_4<br>ICON | COMMAND_<br>1_5<br>ICON | COMMAND_<br>1_6<br>ICON | COMMAND_<br>1_7<br>ICON |
|---|---|---|---|---|---|---|---|
| A10 | A11 | A12 | A13 | A14 | A15 | A16 | A17 |

FIG. 8B

CONTENTS OF DEFINITIONS IN COMMAND WINDOW

| COMMAND NO. | | |
|---|---|---|
| 0_0 | SOURCE CHANGE | CHANGE CHANNEL NAVIGATE AND TAPE LIBRARY NAVIGATE |
| 0_1 | EXTENSION CHANGE | CHANGE ALL AND THIS |
| 0_2 | DISP DETAIL ON/OFF | TURN ON/OFF DISPLAY OF DETAIL |
| 0_3 | DISP ATTRIBUTE CHANGE | CHANGE DISPLAYED PROGRAM TIME INFO (PROGRAM LENGTH↔SRART TIME) IN LISTING AREA |
| 0_4 | DISP ARRANGE CHANGE | CHANGE PROGRAM ORDER (SPELL↔DATE) IN LISTING AREA |
| 0_5 | DISP OBJECT CHANGE | SELECT SOURCE IN LISTING AREA |
| 0_6 | NOT DEFINITION | |
| 0_7 | NOT DEFINITION | |
| 1_0 | VIEW | VIEW PROGRAM SELECTED IN LISTING AREA |
| 1_1 | REC | RECORD PROGRAM SELECTED IN LISTING AREA |
| 1_2 | EPN SET UP | SET UP EPN |
| 1_3 | PROGRAM EDIT | EDIT PROGRAM SELECTED IN LISTING AREA |
| 1_4 | TAPE EDIT | EDIT TAPE (SELECTED IN LISTING AREA) |
| 1_5 | NOT DEFINITION | |
| 1_6 | NOT DEFINITION | |
| 1_7 | NOT DEFINITION | |

FIG. 9B

CONTENTS OF DEFINITIONS IN INPUT WINDOW

| COMMAND | ALL CHANNEL NAVIGATE | THIS CHANNEL NAVIGATE | ALL TAPE NAVIGATE | THIS TAPE NAVIGATE |
|---|---|---|---|---|
| DISP OBJECT CHANGE | SELECT SOURCE IN LISTING AREA | INPUT CHANNEL NO. | × | INPUT TAPE NO. |
| REC | TAPE SPEED/TAPE NUMBER/RECORDING START POSITION ON TAPE | TAPE SPEED/TAPE NUMBER/RECORDING START POSITION ON TAPE | DESIRED PROGRAM/ TAPE SPEED/ RECORDING START POSITION ON TAPE | DESIRED PROGRAM/ TAPE SPEED/ RECORDING START POSITION ON TAPE |
| PROGRAM EDIT | EDIT PROGRAM SELECTED IN LISTING AREA | × | × | × |
| TAPE EDIT | EDIT TAPE (SELECTED IN LISTING AREA) | × | × | × |
| EPN SET UP | SET UP EPN | AUTO CLOCK SET/ AUTO CHANNEL SET/ CABLE BOX SET/ DATA RECEPTION TIME SET/CHANNEL SKIP | AUTO CLOCK SET/ AUTO CHANNEL SET/ CABLE BOX SET/ DATA RECEPTION TIME SET/CHANNEL SKIP | AUTO CLOCK SET/ AUTO CHANNEL SET/ CABLE BOX SET/ DATA RECEPTION TIME SET/CHANNEL SKIP |

APPARATUS AND METHOD FOR CONTROLLING DISPLAY OF ELECTRICAL PROGRAM GUIDE

This application is a Continuation of application Ser. No. 09/217,117 filed Dec. 21, 1998, now U.S. Pat. No. 6,957,386 which is a Continuation of application Ser. No. 08/893,878, filed Jul. 11, 1997, now U.S. Pat. No. 5,909,212.

BACKGROUND OF THE INVENTION

1. Field of the Invention

The present invention relates to an electrical program guide display control apparatus and an electrical program guide display control method for managing information of a multiplicity of broadcast programs and also information of programs recorded by a VTR (Video Tape Recorder) and then producing a display output of such managed information as a program table.

2. Description of the Related Art

Programs of television broadcasts and so forth are transmitted to users via space or through cable television (CATV) via cable.

A user then selects a desired program out of those of the transmission channels and views the selected program on a television receiver or records the same by a VTR. In such a case, it is generally customary that the user makes a selection of a desired program while reading a printed program table.

However, as seen in a cable television broadcasting system for example, the number of transmission channels amounts maximally to 150 or so, and it is not easy for the user to search for a desired program from a program table where programs of, e.g., 150 channels are listed.

For the purpose of realizing an easy search for a desired program, there is proposed a technique of inserting data of a program table of each channel in the vertical blanking interval of a video signal of a specific channel in such a manner as not to cause any disturbance to the television signal of the program. Meanwhile on the receiving side, the user displays the transmitted program table data on a television screen and, after searching for the channel, selects a desired program of the channel.

Such program table data is also termed an electrical program guide. The program information in this electrical program guide includes, for example, names of scheduled programs to be broadcast from receivable stations, and broadcast time slots corresponding to the programs respectively.

The user selects a desired program while watching the electrical program guide displayed on the screen, and then receives and views the selected broadcast program or reserves timed recording of the selected program.

It may naturally be considered that, relative to any video tape (tape cassette) where some broadcast programs have been recorded, the user wants to refer thereto, as an electrical program guide, with regard to the program information representing the names of the recorded programs and the recording order thereof.

To meet such requirement, there is proposed an apparatus wherein, on the VTR side for example, the information relative to the recorded program on the video tape is stored in a predetermined area on the magnetic tape, and later the area of such program information is reproduced, so that the program information recorded on the video tape is displayed.

However, the above function is an independent one which is additional for the VTR and is different from the aforementioned electrical program guide display function. For any user utilizing an AV system equipped with such electrical program guide display function for example, it is preferred that the functions be dealt with integrally, since the electrical program guide display function and the VTR-recorded program information display function are mutually identical in the point of displaying the information relative to the programs. For example, if the two program display functions are dealt with integrally as one electrical program guide, the user is enabled to refer more simply to the information relative to the entire programs.

In any of the electrical program guides known heretofore, display of an electrical program table is executed by using the entire display screen. In this case, when the functions furnished to serve as an electrical program guide are performed by command manipulation to carry out change of the displayed program information contents, retrieval thereof and various settings in accordance with the classified items of program information, the entire picture on the screen is changed in conformity to the content of such command and is therefore rendered quite different from the prior content displayed anterior thereto, hence raising a problem of inconvenience for the user. Such a problem becomes more conspicuous with advanced diversification of the information to be displayed as an electrical program guide or with expedited diversification of the functions.

As for control of various settings and so forth on an electrical program guide, it has been customary that first an individual button or cursor corresponding to the function to be controlled is displayed, and then a required manipulation is executed on the picture by the use of a remote controller or the like. In this case, the number of buttons to be displayed or the number of keys in a remote controller manipulated by the user is increased in accordance with advanced diversification of the functions to consequently complicate the manipulation. In order to avoid such intricate manipulation, there may be contrived a technique of employing a common button for a plurality of functions. However, in this case also, some difficulties are existent in properly actuating the key to be manipulated if no consideration is given to the display format, whereby the user may be confused.

SUMMARY OF THE INVENTION

In view of the problems mentioned, it is an object of the present invention to realize an improved apparatus and method adapted to attain enhanced convenience in controlling display of an electrical program guide.

According to one aspect of the present invention, there is provided an electrical program guide display control apparatus comprising: a broadcast program information storage means for storing, as broadcast program information, the information relative to broadcast programs extracted from predetermined positions of video signals; a recorded program information storage means for storing, as recorded program information, the information relative to broadcast programs recorded in recording media; another recorded program information storage means for storing the recorded program information produced inclusively of record history information relative to the broadcast programs recorded in the recording media; and a display control means capable of displaying, as an electrical program guide to provide the program-related information, the program information relative to both of the broadcast programs and the recorded programs on the basis of the broadcast program information stored in the broadcast program storage means and also the recorded program information stored in the recorded program information storage means.

In this apparatus, the display control means is capable of displaying, as an electrical program guide, at least a program information area in the form of a window to display the program information, a command area in the form of a window to display items for selecting a manipulation command relative to the program guide, and an input area in the form of a window to display items for inputting a required parameter corresponding to the selected manipulation command.

The apparatus of the present invention further comprises a manipulation means for controlling required manipulation on the displayed picture of the electrical program guide. This manipulation means comprises a first mode change manipulator for selectively changing the operation to an electrical program guide display mode or a normal image display mode; a second mode change manipulator for selectively changing the operation to a mode where a manipulation on the program information area is rendered active in the electrical program guide display mode, or to a mode where a manipulation on the command area is rendered active in the electrical program guide display mode; a third mode change manipulator for selectively changing the operation to a mode where a manipulation on the command area is rendered active, or to a mode where a manipulation on the input area is rendered active; and a cursor motion manipulator adapted for manipulation relative to at least the motion of a cursor or setting of parameters on the program information area, the command area and the input area.

And according to another aspect of the present invention, there is provided an electrical program guide display control method which executes display control by: storing the broadcast program information relative to broadcast programs extracted from predetermined positions of video signals; storing, as recorded program information, the information relative to broadcast programs recorded in recording media; and displaying, as an electrical program guide to provide the program-related information, the program information relative to both of the broadcast programs and the recorded programs on the basis of the stored broadcast program information and also the stored recorded program information.

In the above constitution, both the broadcast program information and the recorded program information on video tape or the like can be processed by a single electrical program guide function.

The display format of the electrical program guide is different from the known one that the program guide displayed in the entire picture on the screen is completely changed in accordance with the display content, and instead the guide is divided into a program guide display area, a command display area and an input display area on the screen. And it becomes possible to execute various control manipulations with regard to the electrical program guide on any of such display areas.

Further, the manipulation means can be composed merely of a small number of keys, such as those necessary for shifting the operation to a selected mode set in the electrical program guide, and direction indicating manipulators such as cursor keys for inputting upward, downward, leftward and rightward indications.

The above and other features and advantages of the present invention will become apparent from the following description which will be given with reference to the illustrative accompanying drawings.

BRIEF DESCRIPTION OF THE DRAWINGS

FIG. 3 is a chart-like explanatory diagram showing transitions of modes in the EPN;

FIG. 4 is an explanatory diagram showing transitions of modes in the EPN with display formats;

FIGS. 5A and 5B are explanatory diagrams showing the contents of display in a MAIN window;

FIG. 6 is an explanatory diagram showing examples of concrete display formats of a MAIN window and a COMMAND window;

FIGS. 8A to 8C are explanatory diagrams showing the contents of display in the COMMAND window;

FIGS. 9A to 9C are explanatory diagrams showing the contents of display in an INPUT window;

DESCRIPTION OF THE PREFERRED EMBODIMENT

Hereinafter a preferred embodiment of the present invention will be described in detail with reference to FIGS. 1 through 15.

Figure 1:
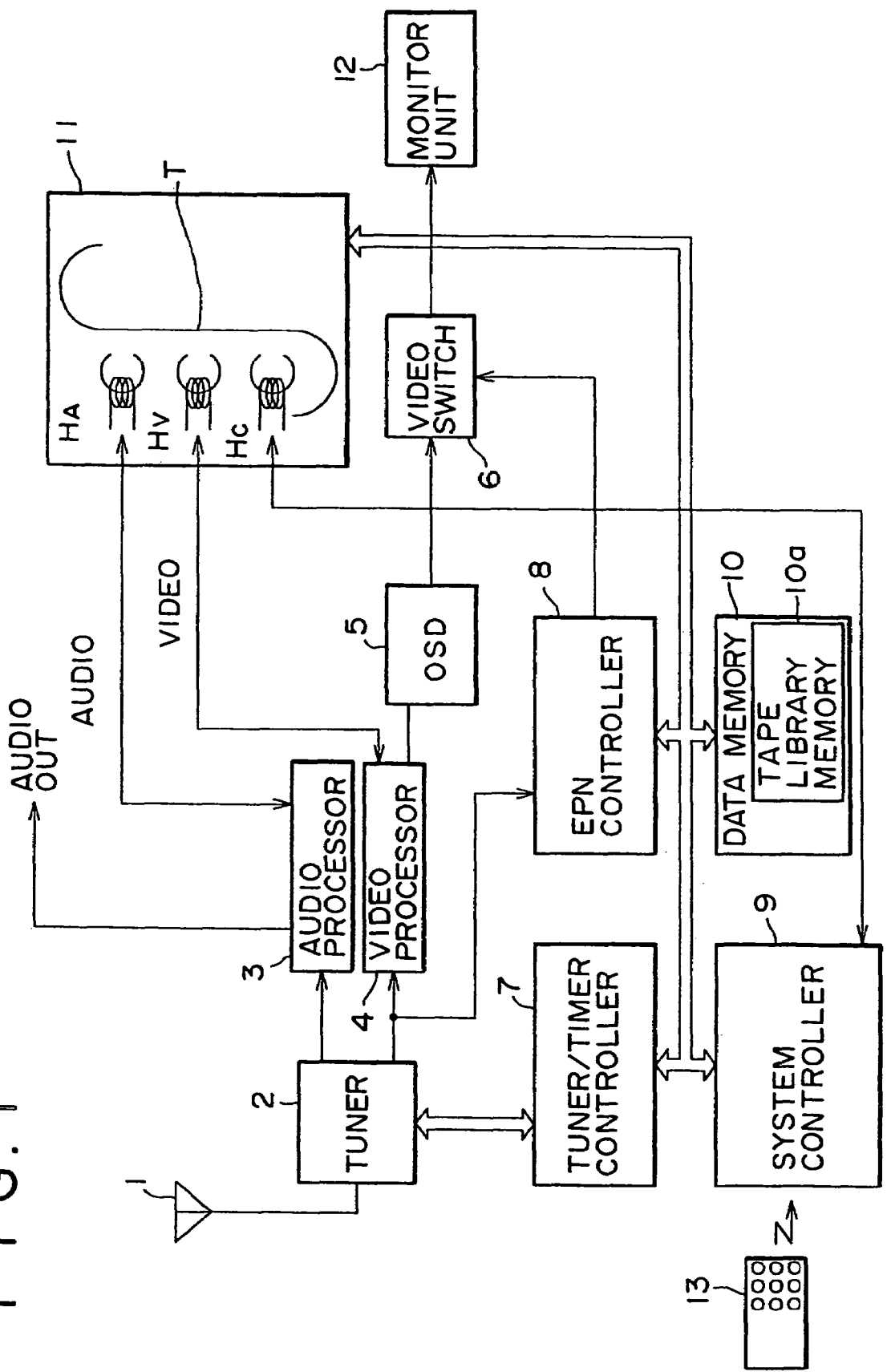
FIG. 1 is a block diagram showing a structural example of an electrical program guide display control apparatus according to an embodiment of the present invention.

Explanations thereof will be given in the following order.
1. Structural example of electrical program guide display control apparatus according to embodiment
2. Mode transition of EPN in embodiment
3. Explanation of main window
4. Explanation of command window
5. Explanation of input window
6. Manipulation examples in EPN
7. Explanation of processing operation 1. Structural Example of Electrical Program Guide Display Control Apparatus According to Embodiment FIG. 1 is a block diagram showing a structural example of an electrical program guide display control apparatus according to a preferred embodiment of the present invention. In this embodiment, as will be described later, information of broadcast programs and information of the programs recorded on a video tape by a VTR are outputted to be displayed as an electrical program guide. This program guide will be referred to as EPN (Electrical Program Navigator) below.

In FIG. 1, broadcast waves received by an antenna 1 are supplied to a tuner 2, where a received channel is selectively tuned in. A video signal of the channel thus selected is supplied to both a video processor 4 and an EPN controller 8, while an audio signal is supplied to an audio processor 3.

The audio signal inputted to the audio processor 3 is processed in a predetermined manner and then is delivered as an audio output signal Audio Out therefrom. The audio processor 3 is connected to an audio recording/reproducing head $H_A$ in a VTR 11. And in a recording mode, the audio signal processed in the audio processor 3 is supplied to the audio recording/reproducing head $H_A$, which then records the audio signal on a magnetic tape T. Meanwhile in a reproducing mode, the audio processor 3 is supplied with the audio signal reproduced from the magnetic tape T by the audio recording/reproducing head $H_A$ and, after processing the input signal in a predetermined manner, delivers an audio output signal Audio Out therefrom.

The video processor 4 is capable of processing the input video signal in a predetermined manner and then delivering the processed video signal to a video recording/reproducing head HV in the VTR 11 and also to an on-screen display (OSD) 5.

In this case, as a recording operation of the VTR 11 in the recording mode, the video signal processed in the video processor 4 is supplied to the video recording/reproducing head HV to be thereby recorded on the magnetic tape T. Meanwhile in the reproducing mode, the video processor 4 is supplied with the video signal reproduced from the magnetic tape T by the video recording/reproducing head $H_V$ and, after processing the input signal, delivers the processed signal to the on-screen display (OSD) 5.

In the on-screen display 5, a video signal representing a required character, symbol or the like is superimposed on the video signal supplied from the video processor 4, whereby the character, symbol or the like is superimposed at a predetermined position on the image being displayed on a monitor unit 12.

A video switch 6 selectively switches or composites the normal video signal outputted from the on-screen display 5 (the video signal obtained through reception and channel selection in the tuner 2, or the video signal reproduced in the VTR 11) and the video signal of the EPN picture outputted from an undermentioned EPN controller 8. In the video switch 6 employed in this embodiment, it is possible to composite the video signal of the EPN picture outputted from the EPN controller 8 with the video signal outputted from the on-screen display 5, thereby imposing the EPN video signal on the normal picture on the display screen of the monitor unit 12 to consequently display the EPN picture in the form of a window.

The monitor unit 12 displays the video signal supplied thereto from the video switch 6.

In the VTR 11, the audio and video signals supplied respectively from the audio processor 3 and the video processor 4 are recorded on the magnetic tape T by the audio recording/reproducing head $H_A$ and the video recording/reproducing head $H_V$ respectively. Further the audio and video signals recorded on the video magnetic tape T are reproduced therefrom by the audio recording/reproducing head $H_A$ and the video recording/reproducing head $H_V$ respectively, and then are supplied to the audio processor 3 and the video processor 4 respectively.

In this embodiment, a control action for recording and reproduction in the VTR 11 is executed in a tuner/timer controller 7, and the program of the channel received and selected by the tuner 2 can be recorded through the control action of the tuner/timer controller 7. Also due to the control action of the tuner/timer controller 7, the broadcast program (of the channel received and selected by the tuner 2) can be recorded with timed reservation on the basis of a designated selection channel, a reserved recording time and so forth.

A control head Hc in the VTR 11 records and/or reproduces a control signal generated in response to a vertical sync signal and used for attaining synchronism in the reproducing mode, and further records, in this embodiment, a data signal of record program information outputted from a system controller 9 in such a manner as to superimpose this data signal on the control signal. And in the reproducing mode, the control head Hc reproduces the data signal of record program information recorded together with the control signal on a control track of the magnetic tape T, and then supplies the reproduced data signal to the system controller 9.

The tuner/timer controller 7 serves to control a channel selection of the tuner 2 and a timer recording reservation of the VTR 11.

The EPN controller 8 executes control of the EPN display output and the display thereof.

In this embodiment, data signals of the electrical program guide used as guide information relative to broadcast programs are inserted in predetermined horizontal lines during the vertical blanking interval of the video signal sent from the transmitting side. Then the EPN controller 8 is supplied with the video signal obtained through reception and channel selection by the tuner 2 and, after extracting the data signal component of the electrical program guide from the video signal, decodes the extracted signal component to thereby acquire the electrical program guide data. The electrical program guide data thus decoded is stored in a data memory 10. If necessary, an EPN video signal is produced by reading out the electrical program guide data stored in the data memory 10 (and undermentioned tape library data) and then is supplied to the video switch 6, whereby the EPN is displayed on the monitor unit 12.

The system controller 9 consists of a microcomputer for example and serves to control the processing of each function circuit. The system controller 9 is equipped with an unshown receiver which receives an input signal transmitted from a remote controller 13 as command information. And in response to such command information, the system controller 9 executes a control action for each of the function circuits described above.

The data memory 10 consists of a nonvolatile memory for example and has an area for storing the electrical program guide data relative to the broadcast program obtained in the EPN controller 8 as mentioned.

This embodiment is so constituted that, when recording a broadcast program by the VTR 11, required data (hereinafter referred to as tape library data) relative to the record program is produced in the EPN controller 8 as a recording event in such a manner that proper correspondence is ensured to the video tape where the program is recorded, and such tape library data is stored in the data memory 10. For this purpose, the data memory 10 includes a tape library memory 10a as an area for storing the tape library data.

Hereinafter "electrical" program guide data relative to broadcast programs and tape library data will be collectively referred to as EPN data.

Regarding the contents of the tape library data, the data required for attaining proper correspondence to the program-recorded video tape includes data of the cassette number of the program-recorded video tape and also data indicating the recording order of the programs recorded on the video tape. In the case of this embodiment, it is necessary to provide, by the aforementioned control head Hc, at least the cassette number data and the program data signifying the identities of the recorded programs and the recording start positions thereof on the video tape.

As for the information relative to each of the recorded programs, various data may be considered inclusive of the program name, the start and end times and so forth. Such information relative to the programs can be produced on the basis of the electrical program guide data corresponding respectively to the recorded programs.

The remote controller 13 is equipped with various keys to perform required manipulations with regard to the respective operations of the function circuits shown in this diagram, and a command signal composed of infrared rays or electric waves is transmitted by a manipulation of each key.

Figure 2:
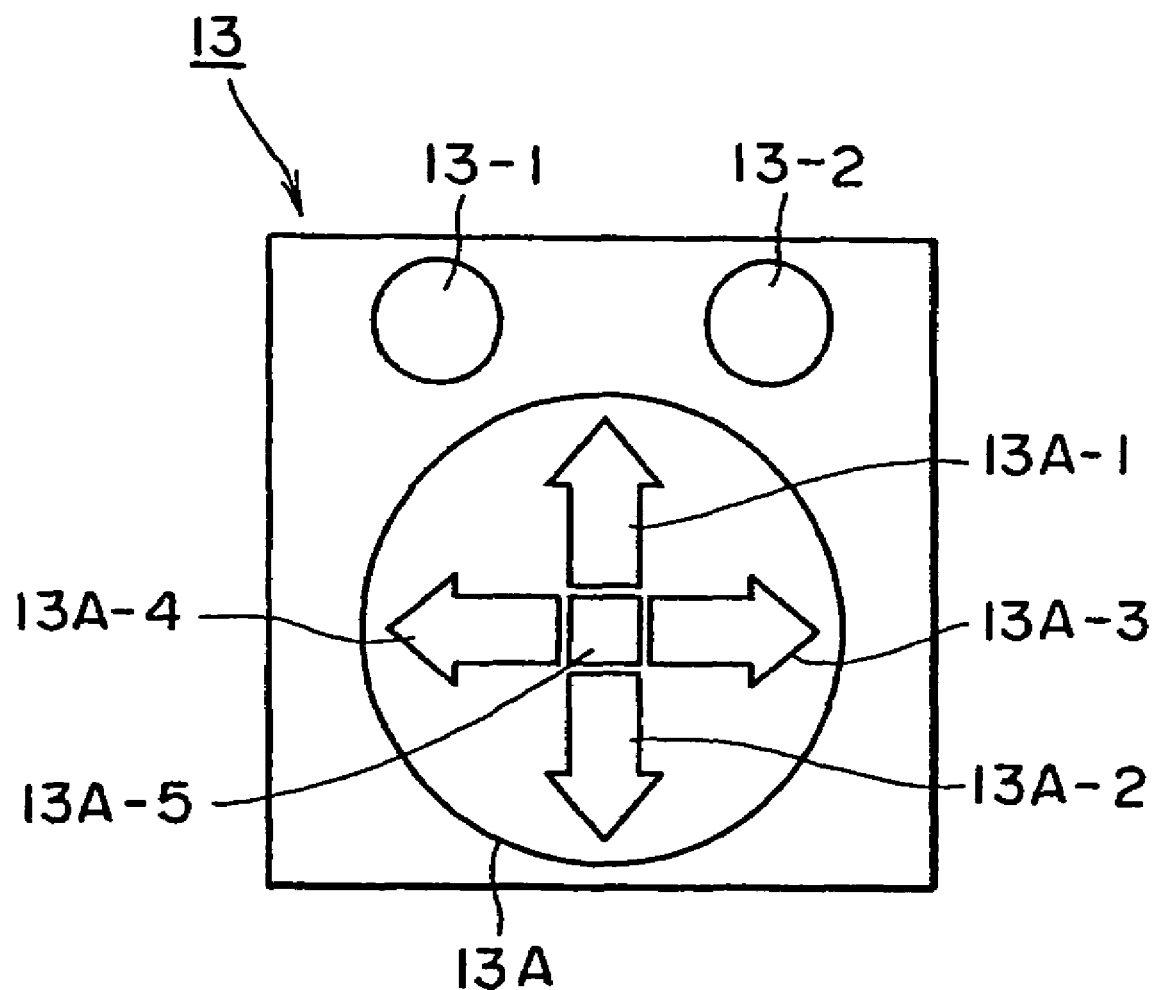
FIG. 2 is a plan view of an EPN-control key manipulating portion in a remote controller.

FIG. 2 illustrates the positions of keys disposed on a key panel of the remote controller 13 to perform various manipulations, as will be described later, on an EPN picture according to this embodiment.

In this diagram, there are shown an EPN key 13-1, a command key 13-2 and a joystick 13A.

The EPN key 13-1 is used for selectively changing the operation to a "normal mode" to display a normal picture (image obtained through reception and channel selection by the tuner 2, or image reproduced by the VTR 11), or to an "EPN mode" to display an EPN picture. The command key 13-2 is provided for shifting the operation in the "EPN mode" to a MAIN window (MAIN mode) or a COMMAND window (COMMAND mode).

The joystick 13A comprises four direction indicating keys inclusive of an up key 13A-1, a down key 13A-2, a right key 13A-3 and a left key 13A-4, and an EXE key 13A-5. The four direction indicating keys are used for moving an undermentioned color bar or cursor displayed on the EPN picture in accordance with the direction of manipulation of each key, and also for incrementing or decrementing an input numerical value or on/off setting by the up key 13A-1 or down key 13A-2. Hereinafter such four direction indicating keys will be collectively referred to as cursor keys, since these are used principally for moving a color bar or cursor.

And the EXE key 13A-5 is used for shifting the operation with an EPN picture to a COMMAND window (COMMAND mode) or an INPUT window (INPUT mode), as will be described later.

2. Mode Transition of EPN in Embodiment

Referring next to FIGS. 3 and 4, an explanation will be given on a mode transition of EPN in this embodiment. FIG. 3 is a chart showing the concept of an EPN mode transition in this embodiment, and FIG. 4 shows an EPN mode transition together with display of a window on an EPN picture.

In FIGS. 3 and 4, a normal mode is an ordinary one for displaying an image obtained through reception and channel selection by the tuner 2 or a video image reproduced by the VTR 11 as described. In this embodiment, an EPN mode for displaying an EPN picture is set in contrast with the normal mode. Selective change of the operation to the normal mode or the EPN mode is executed by manipulating the EPN key 13-1 shown in FIG. 2.

In the EPN mode, there further exist a MAIN mode, a COMMAND mode and an INPUT mode.

In this embodiment, when the state of normal mode is changed to the EPN mode by a manipulation of the EPN key 13-1, first the operation enters the MAIN mode, as seen in FIGS. 3 and 4.

In the MAIN mode, a MAIN window W1 for example is displayed within the picture P on the screen, as shown in FIG. 4. In this case, the image in the normal mode for example is displayed continuously in any other area of the picture P other than the MAIN window W1. In a modification, a blue background may be displayed as well.

In the MAIN window W1, program information of the electrical program guide (program information of scheduled broadcast) is displayed in accordance with a display mode based on an undermentioned display format, and also information of the program recorded already on the video tape by the VTR 11 of the relevant apparatus is displayed in accordance with a navigate mode.

In this case, navigate modes selectable in the MAIN mode include, as shown in FIG. 3, "All channel navigate", "This channel navigate", "All tape navigate" and "This tape navigate", of which definitions will be described later.

If the command key 13-2 is manipulated during the MAIN mode selected in the EPN mode, the operation is changed from the MAIN mode to the COMMAND mode, as shown in FIGS. 3 and 4. In this state, a COMMAND window W2 is also displayed in addition to the MAIN window W1, as shown in FIG. 4. This COMMAND mode is selected when executing a desired specific manipulation relative to the EPN, and various command items are displayed within the COMMAND window W2 to execute the specific manipulation.

In the display state of FIG. 4 during the COMMAND mode, the content in the MAIN window W1 is denoted with oblique lines, while the content in the COMMAND window W2 is expressed with white characters on a colored background, signifying that the COMMAND window W2 is an active one where some display is performed to indicate that a manipulation with the cursor key shown in FIG. 2 is effective.

In FIG. 3, a total of six manipulation items are described with regard to the COMMAND window W2, such as [source change/extension change] . . . [EPN set up], which will be mentioned later.

Next, when the EXE key 13A-5 is manipulated during the COMMAND mode in the EPN mode and in a state where a certain specific manipulation item is selected, the operation is shifted from the COMMAND mode to the INPUT mode as shown in FIGS. 3 and 4. In this INPUT mode, an INPUT window W3 is also displayed in addition to the COMMAND windows W1 and W2, as shown in FIG. 4. In this case, the INPUT window W3 is rendered active as seen from that the display content in the INPUT window W3 alone is expressed with white characters on a colored background.

The INPUT mode is selected for inputting a required parameter or the like belonging to the manipulation item specified in the COMMAND window W2 for example, and a display is so executed in the INPUT window W3 as to enable input of such a parameter.

In FIG. 3, a total of six input items are described with regard to the INPUT window W3, such as [rec input] . . . [tape edit], which will be mentioned later.

Upon completion of proper input of a required parameter or after a manipulation of the EXE key 13A-5 during the INPUT mode, the operation is shifted to the COMMAND mode.

When the EPN key 13-1 is manipulated during any mode selected in the EPN mode, the operation is returned directly to the normal mode.

3. Explanation of MAIN Window

Hereinafter an explanation will be given on some concrete display formats of MAIN window W1, COMMAND window W2 and INPUT window W3 each displayed as an EPN picture described in FIGS. 3 and 4. First, the MAIN window W1 will be explained with reference to FIGS. 5 to 7.

Figure 5A:
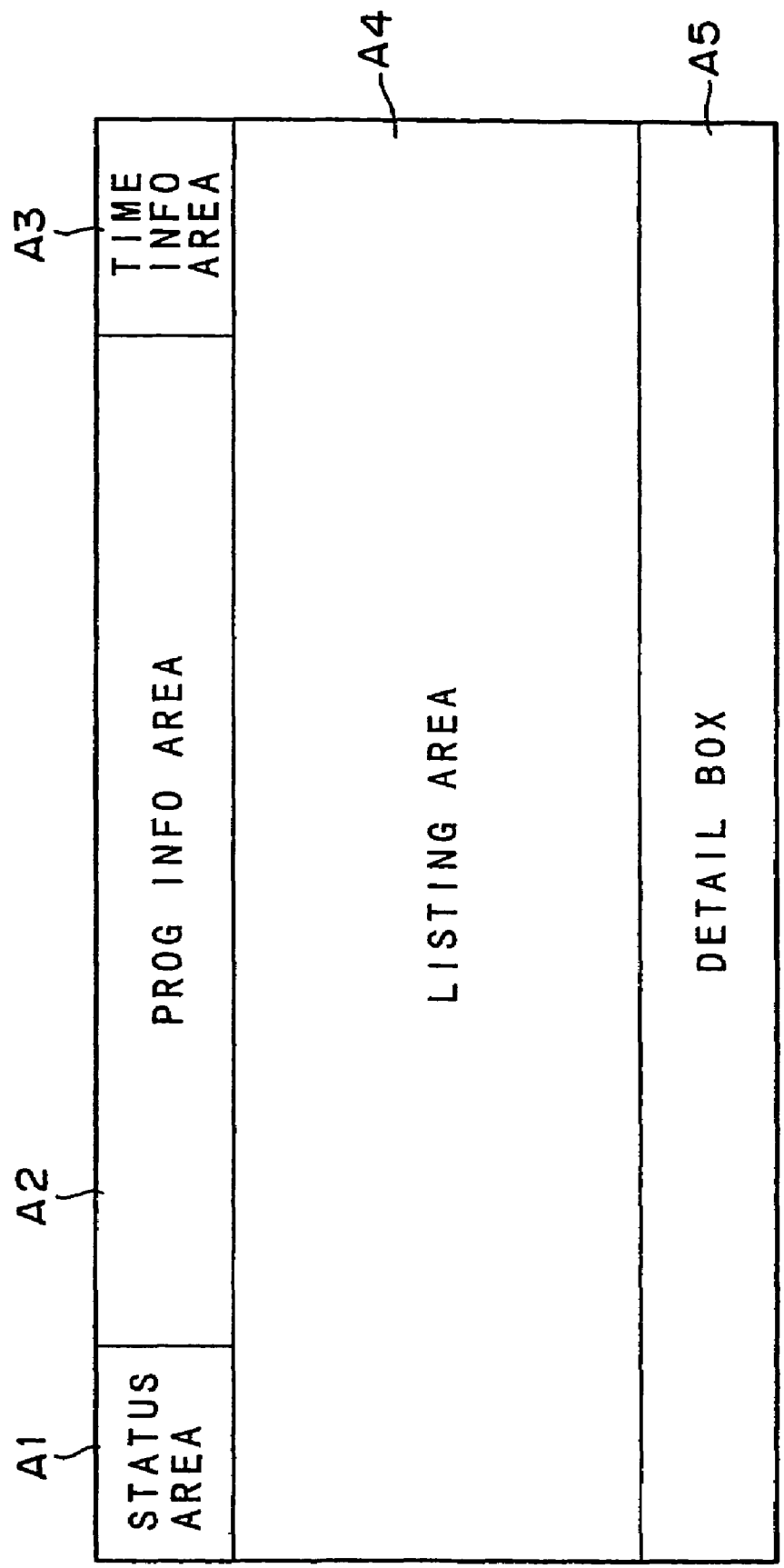

FIG. 5A shows divided display areas of the MAIN window W1 illustrated in FIG. 4.

As shown in this diagram for example, the MAIN window W1 is divided into five display areas of status area (A1), prog info area (A2), time info area (A3), listing area (A4) and detail box (A5).

FIG. 5B shows display contents in the respective display areas of the MAIN window W1 in the individual modes.

As described, four navigate modes of "All channel navigate", "This channel navigate", "All tape navigate" and "This tape navigate" are set in the MAIN mode. First, the definitions of such navigate modes will be explained below.

"All channel navigate" is a mode for providing entire information relative to programs being broadcast or those scheduled to be broadcast subsequently to the current time, and "This channel navigate" is a mode for providing information relative to a program being broadcast or programs scheduled to be broadcast subsequently to the current time in a certain channel specified by a predetermined manipulation.

Meanwhile, "All tape navigate" is a mode for providing, with reference to the entire tape library data stored until then in the tape library memory 10a, the information relative to the entire programs recorded in all video tape cassettes until then by the VTR 11. And "This tape navigate" is a mode for providing the information relative to the programs recorded in one video tape cassette selected by a predetermined manipulation out of all video tape cassettes recorded until then by the VTR 11.

Thus, the EPN display content is properly changed through selective switching of the four navigate modes to consequently switch the function as an electrical program guide relative to the broadcast programs of entire channels or any specific one thereof, or to switch the function as an electrical program guide relative to the recorded programs in the entire tape cassettes or any specific one thereof recorded until then by the VTR 11.

This mode switching operation can be performed by selecting a desired command item on the COMMAND window W2 and executing a required manipulation.

According to FIG. 5B, the status area (A1) is a region for displaying the current status (of navigate mode) in the EPN, hence signifying which one of the aforementioned four navigate modes is currently set.

The prog info area (A2) is a region for displaying the information relative to the program (where the cursor is placed) selected currently in the listing area (A4). And when the operation is in "All channel navigate" mode or "This channel navigate" mode, the channel number corresponding to the broadcast program, the start/end times of the program and so forth are displayed. Meanwhile, if the operation is in "All tape navigate" mode or "This tape navigate" mode, there is displayed the information inclusive of the number assigned to the program-recorded video tape (i.e., tape number), the program start/end positions on the tape and so forth.

The time info area (A3) is used for displaying the current time regardless of any mode.

The listing area (A4) is a region for displaying the program information per row in accordance with the attribute of the mode displayed in the status area (A1). In "All channel navigate" mode or "This channel navigate" mode, the information inclusive of program name, program length (or start time) and broadcast channel is displayed in a visually recognizable manner. Meanwhile in "All tape navigate" mode or "This tape navigate" mode, the information inclusive of program name, program length (or start position) and program-recorded video tape No. is displayed.

The detail box (A5) is used to display some comment on the program selected in the listing area (A4). In this case, if the operation is in "All channel navigate" mode or "This channel navigate" mode, character display (1st detail) signifying the summarized content of the program is executed on the basis of the electrical program guide data. In this embodiment, however, it is defined as non-display in "All tape navigate" mode or "This tape navigate" mode.

FIG. 6 shows a concrete display example of the MAIN window. In this case, an icon signifying "All channel navigate" mode is displayed in the status area (A1), and the start/end times of a program name "Sisters" selected in the listing area (A4) are displayed with bars in the prog info area (A2), and further the current time is displayed with characters in the time info area (A3). A program name, a broadcast start time and a broadcasting station name are displayed in the listing area (A4). In this exemplary diagram, a color bar CB (corresponding to a cursor) is placed in the column of the program name "Sisters" to indicate that the program "Sisters" is currently selected. And a comment representing the summarized content of the program "Sisters" is displayed in the detail box (A5).

FIGS. 7A to 7D show functions allocated to EPN key 13-1, command key 13-2 and cursor keys (13A-1-13A-4) in the MAIN mode. The EXE key 13A-5 is not used in the MAIN mode, and its manipulation is invalid in this mode. FIGS. 7A, 7B, 7C and 7D represent examples in "All channel navigate" mode, "This channel navigate" mode, "All tape navigate" mode and "This tape navigate" mode, respectively.

In any of the four modes selected in the MAIN mode, as will be seen from these diagrams, the operation is returned to the normal mode in response to a manipulation of the EPN key 13-1 or is shifted to the COMMAND mode in response to a manipulation of the command key 13-2. When the up key 13A-1 or the down key 13A-2 is manipulated as a cursor key, the color bar CB in the listing area (A4) is shifted per column in accordance with the direction of the manipulated key to thereby change the selected program.

Meanwhile, when the right key 13A-3 or the left key 13A-4 is manipulated as a cursor key, the definition thereof is different depending on the navigate mode selected in the MAIN mode.

Figure 7A:
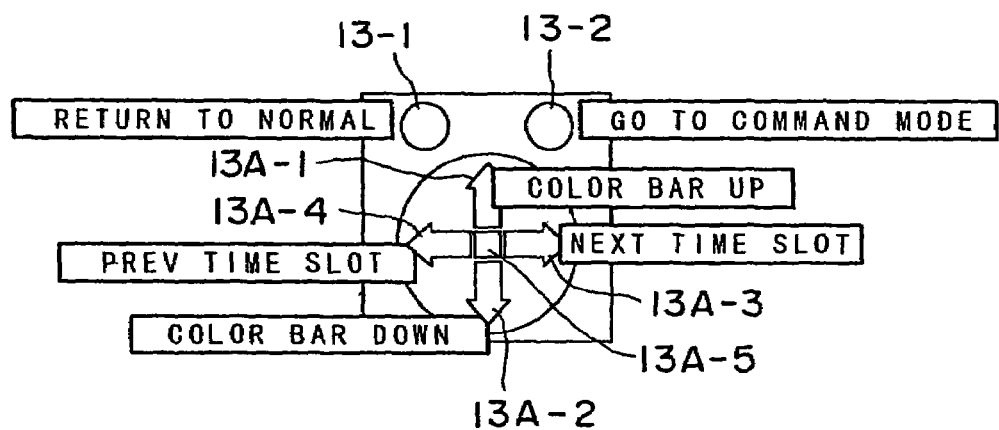
FIGS. 7A to 7D are explanatory diagrams showing functions allocated to keys in a MAIN mode.

In "All channel navigate" mode, as shown in FIG. 7A, a function of "next time slot" is allocated to the right key 13A-3, and a function of "previous time slot" to the left key 13A-4, respectively. In this case, when the right key 13A-3 is manipulated, programs in the next broadcast time slot are displayed as a list in the listing area (A4). Meanwhile, when the left key 13A-4 is manipulated, programs in the previous broadcast time slot before the program being displayed currently are displayed as a list in the listing area (A4).

Figure 7B:
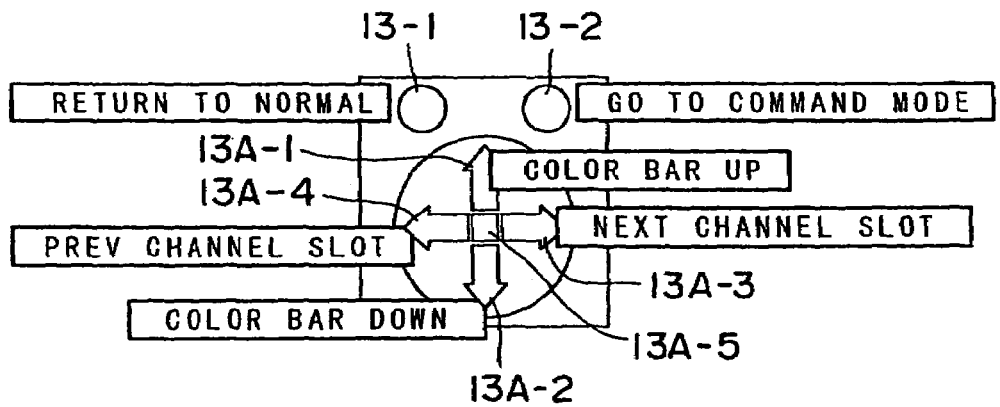
Figure 7C:
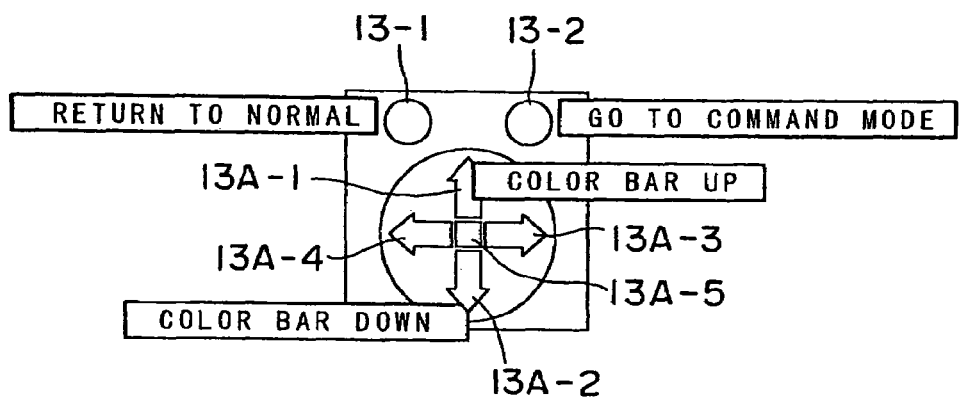

In "This channel navigate" mode, as shown in FIG. 7B, a function of "next channel slot" is allocated to the right key 13A-3, and a function of "previous channel slot" to the left key 13A-4, respectively. In this case, when the right key 13A-3 is manipulated, programs of the next channel number subsequent to the channel being specified currently are displayed as a list in the listing area (A4). Meanwhile, when the left key 13A-4 is manipulated, programs of the previous channel number prior to the channel being specified currently are displayed as a list in the listing area (A4).

Figure 7D:
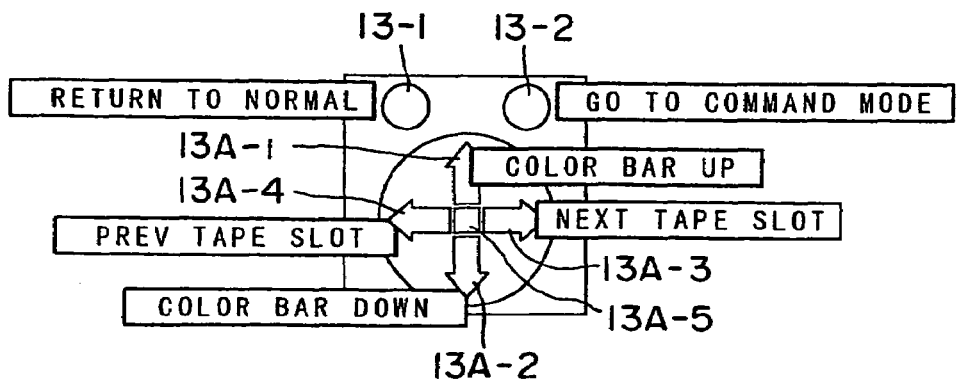

In "This tape navigate" mode, as shown in FIG. 7D, a function of "next tape slot" is allocated to the right key 13A-3, and a function of "previous tape slot" is allocated to the left key 13A-4, respectively. In this case, when the right key 13A-3 is manipulated, the programs recorded on the next-numbered video tape subsequent to the video tape number being specified currently are displayed as a list in the listing area (A4). Meanwhile, when the left key 13A-4 is manipulated, the programs recorded on the previous-numbered video tape prior to the video tape number being specified currently are displayed as a list in the listing area (A4).

4. Explanation of COMMAND Window

Next, a concrete display format of the COMMAND window W2 will be explained with reference to FIGS. 8A to 8C.

FIG. 8A shows divided display areas of the COMMAND window W2. As shown in this diagram, the COMMAND window W2 is divided into eight display areas A10-A17 where command icons are to be displayed. In this embodiment, two display modes of a command_0 mode and a command_1 mode are prepared for the COMMAND window W2. The command_0 mode and the command_1 mode are so defined that command icons displayed in the display areas A10-A17 become mutually different. More specifically, in the command_0 mode, command icon 0_0-command icon 0_7 are displayed in the areas A10-A17 respectively; while in the command_1 mode, command icon 1_0-command icon 1_7 are displayed in the areas A10-A17 respectively.

Therefore, it is possible in this embodiment to set and display a maximum of sixteen command icons in the COMMAND window W2 having eight display areas, so that more functions can be displayed in the COMMAND window W2 within the limited display space according to this embodiment.

Figure 8C:
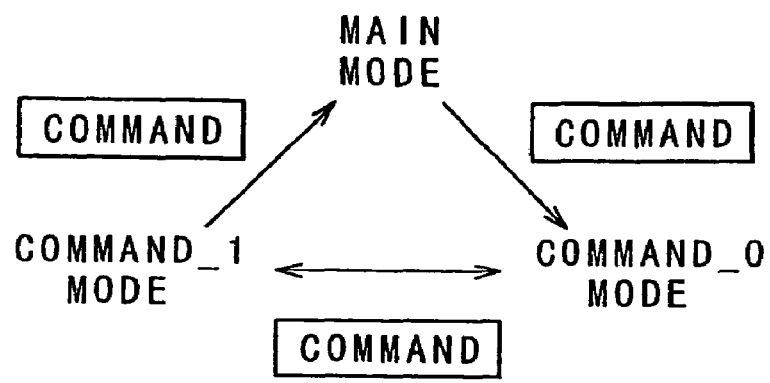

Changing the command_0 mode and the command_1 mode is executed by manipulating the command key 13-2, as shown in FIG. 8C. For example, when the command key 13-2 is manipulated in the MAIN mode, the operation is shifted to the COMMAND mode, where the command_0 mode is selected. And if the command key 13-2 is manipulated in this state, the COMMAND mode is maintained while the command_0 mode is changed to the command_1 mode. Further, upon another manipulation of the command key 13-2 in this state, the operation is returned to the MAIN mode again.

FIG. 8B shows the definition contents (command icons) of the display areas in the COMMAND window W2 correspondingly to command Nos. In this diagram, command Nos. 0_0-0_7 and 1_0-1_7 are included. These command Nos. correspond to the command items denoted respectively by the command icons 0_0-0_7 and 1_0-1_7 described with reference to FIG. 8A.

According to this diagram, command No. 0_0 is defined as [source change] which is an item for changing the channel navigate mode and the tape navigate mode.

Command No. 0_1 is defined as [extension change] which is an item for changing "All" and "This" modes in the channel navigate mode and the tape navigate mode.

Command No. 0_2 is defined as [display detail on/off] for switching on or off the display in the detail box (A5).

Command No. 0_3 is defined as [display attribute change] which is an item for selectively changing the display of the information relative to the time of the program in the listing area. Command No. 0_4 is defined as [display arrange change] for changing the display order of the programs in the listing area. Command No. 0_5 is defined as [display object change] for selecting a source in the listing area.

Command No. 0_6 and command No. 0_7 are not defined.

Command No. 1_0 is defined as [view] which is an item for viewing the program selected in the listing area.

Command No. 1_1 is defined as [rec] for execution of video recording (including reserved recording) of the program selected in the listing area.

Command No. 1_2 is defined as [EPN set up] which is an item for setting up an EPN image in various manners. As will be described later, when this item is selected in the COMMAND mode, the operation is shifted to the INPUT mode to display an INPUT window where required set-up parameters are displayed.

Command No. 1_3 is defined as [program edit] for editing the program selected in the listing area; and command No. 1_4 is defined as [tape edit] for editing the video tape selected in the listing area. When either of these command items for editing is selected, the operation is shifted to the INPUT mode to display an INPUT window where required editing parameters are displayed.

Command Nos. 1_5 to 1_7 are not defined.

More specifically, in the COMMAND mode, the command items defined by the above command Nos. 0_0-0_7 and 1_0-1_7 are allocated respectively to command_0 mode and command_1 mode. And in such command_0 mode and command_1 mode, icons symbolizing the items of command Nos. 0_0-0_7 and 1_0-1_7 are displayed in the areas A10-A17 of the COMMAND window W2.

The display area corresponding to any non-defined command No. is not displayed in the COMMAND window W2.

FIG. 6 shows a concrete display example of the COMMAND window W2. In this diagram, exemplary command icons employed in the command_0 mode are displayed in the areas A10-A15.

In the COMMAND mode where the COMMAND window W2 is displayed as shown in FIG. 6, a user can select a desired command item by manipulating, e.g., the right key 13A-3 or left key 13A-4 and moving the cursor to the relevant display area in the COMMAND window W2. And if the EXE key 13A-5 is manipulated in this state, the function corresponding to the selected command item is executed. In another case, the operation is shifted to the INPUT mode to display an INPUT window W3 where a parameter corresponding to the selected command item is displayed.

5. Explanation of INPUT Window

Figure 9A:
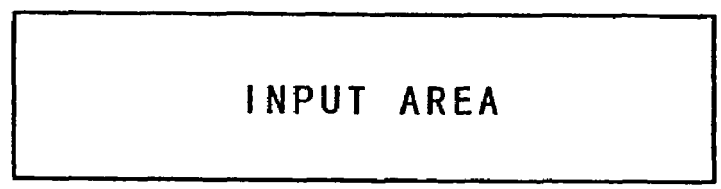

Next, a concrete display format of the INPUT window W3 will be explained with reference to FIGS. 9A-9C.

The entire display area of the INPUT window W3 is defined as an input area, which is displayed under the COMMAND window W2 as shown in FIG. 4 for example.

Figure 9C:
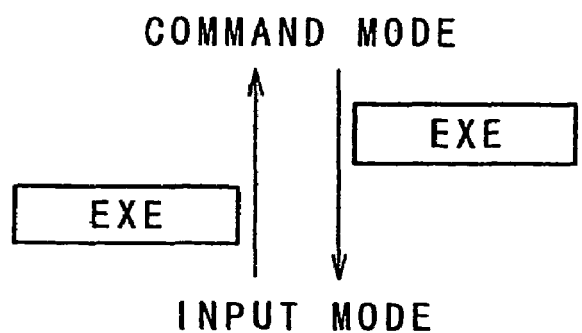

A shift to the INPUT mode is shown in FIG. 9C. In the COMMAND mode for example, when the EXE key 13A-5 is manipulated for entry in a state where a cursor is placed on a desired command icon (command item) by a manipulation of the cursor key or the like, the operation is shifted to the INPUT mode to display the INPUT window W3, where a parameter corresponding to the selected command is displayed. In the INPUT mode, naturally the INPUT window W3 is rendered active.

When the EXE key 13A-5 is manipulated after any parameter to be changed in the INPUT window W3 for example is changed by a predetermined manipulation, then the INPUT window W3 is erased and instead the COMMAND window W2 is rendered active. That is, the operation is shifted from the INPUT mode to the COMMAND mode.

In FIG. 9B, there are shown definitions of the contents of parameters displayed in the INPUT window W3 with regard to four navigate modes of "All channel navigate", "This channel navigate", "All tape navigate", and "This tape navigate".

In this diagram, command items (see FIG. 8B) selected in the COMMAND mode are shown in the leftmost (vertical) column.

For example, when a command item of [display object change] is selected in the COMMAND mode, it follows that a source in the listing area is selected. In this case, if "This channel navigate" mode or "This tape navigate" mode is set as shown in FIG. 9B, there is displayed the INPUT window W3 where channel No. is inputted as a selected source.

When a command item of [display object change] is selected in "All channel (tape) navigate" mode, the INPUT window W3 is not displayed (i.e., the operation is not shifted to the INPUT mode).

When a command item of [rec] is selected in All (This) channel navigate mode, parameters representing tape speed, tape No. and recording start position on tape are displayed in the INPUT window W3.

When a command item of [rec] is selected in: "All (This) tape navigate" mode, parameters representing recorded program, tape speed and recording start position on tape are displayed in the INPUT window W3.

In this embodiment, when a command item of [program edit] or [tape edit] is selected, the operation is not shifted to the INPUT mode in the present state, i.e., any editing function for the program or tape being selected in the listing area is not set. Regarding the future, however, such editing function may be provided as well, and in this case, parameters corresponding to the command item of [program edit] or [tape edit] are displayed in the INPUT window.

When a command item of [EPN set up] is selected in the COMMAND mode, the INPUT window W3 for EPN set up is displayed in either "All (This) channel navigate" mode or "All (This) tape navigate" mode.

Parameters displayed at this time in the INPUT window W3 are such as auto clock set, auto channel set, cable box set, data reception time set, and channel skip.

The user is enabled to perform on/off setting of functions or to input numerical values by manipulating predetermined keys, which are disposed in the remote controller 13, correspondingly to parameters in the INPUT window displayed in the INPUT mode, as described. Keys to be manipulated for such on/off setting of parameters or input of numerical values may be various ones inclusive of ten numeral keys, and it is possible to constitute the apparatus in such a manner as to perform on/off setting of functions or to change input numerical values by means of the up key 13A-1 and the down key 13A-2 for example. That is, the apparatus may be so constituted that, in the EPN mode, all control actions are executable by manipulation of merely a few keys shown in FIG. 2 out of the entire keys provided in the remote controller 13, hence eliminating confusion in manipulation of the keys by the user.

6. Manipulation Examples in EPN

Hereinafter some examples of manipulation in the EPN according to this embodiment will be explained with reference to FIGS. 10 and 11.

FIGS. 10A to 10E illustrate, together with displayed images, manipulation examples in selecting a desired program, which is to be viewed from now on by the user, from a program table displayed in an EPN picture.

Figure 10A:
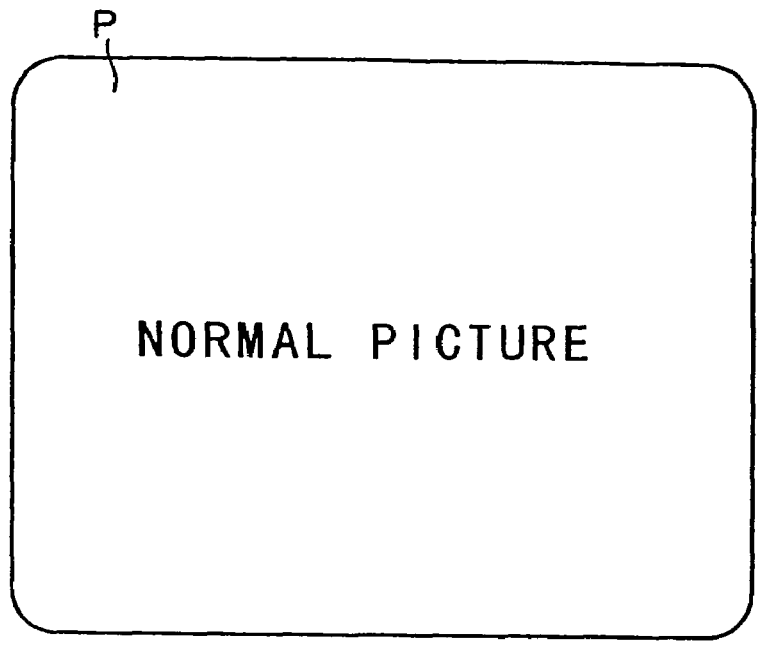
FIGS. 10A to 10E are explanatory diagrams showing examples of manipulations in the EPN.
Figure 10B:
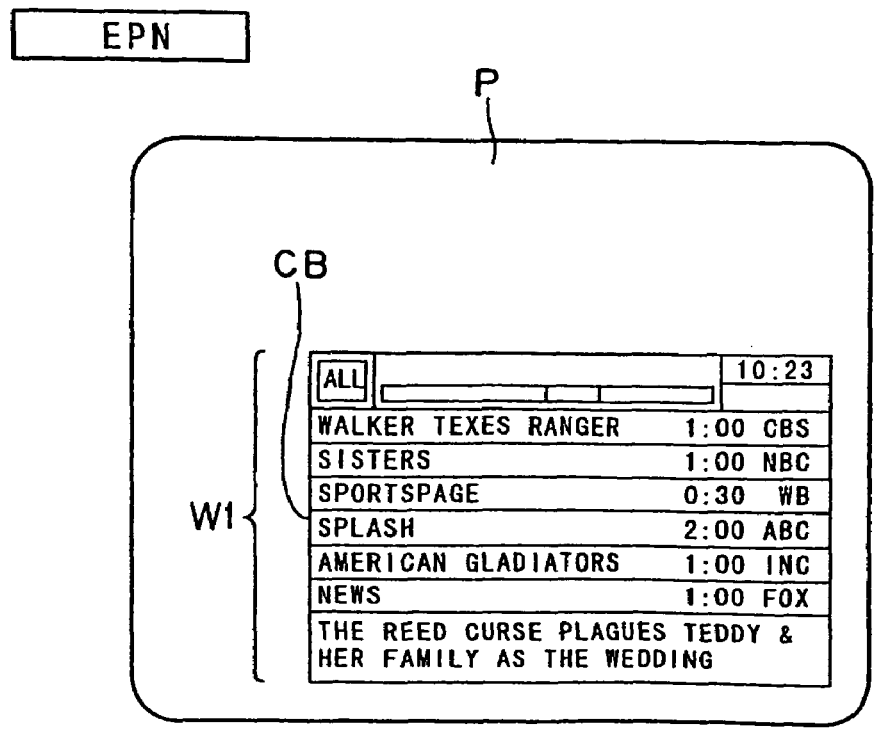

FIG. 10A represents a picture in the normal mode. In this state, actually an image of the broadcast program selected by the tuner 2 or an image of the video tape being reproduced by the VTR 11 is displayed as a picture P on the screen. If the EPN key 13-1 is manipulated in this state, the operation is shifted to the MAIN mode where, as shown in FIG. 10B, a MAIN window W1 is displayed. It is supposed here that, in the MAIN window W1, All (This) channel navigate mode relative to the broadcast program is set.

In the MAIN window W1 of FIG. 10B, a color bar CB is placed in the column of a program "Sisters" in the listing area. After finding a desired program in this state, the user can place the color bar CB therein by manipulating cursor keys.

Assume here that, for example, the user wants to view a program "Splash".

Figure 10C:
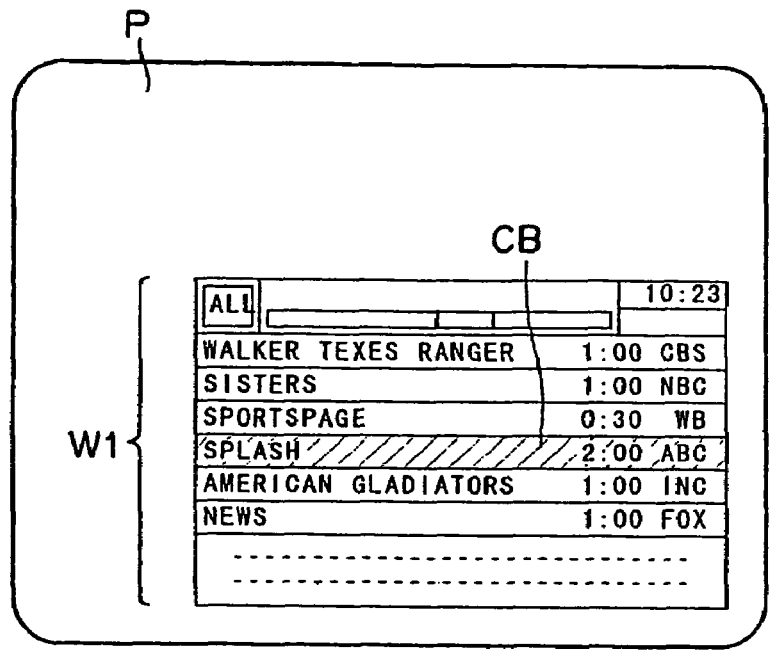
Figure 10D:
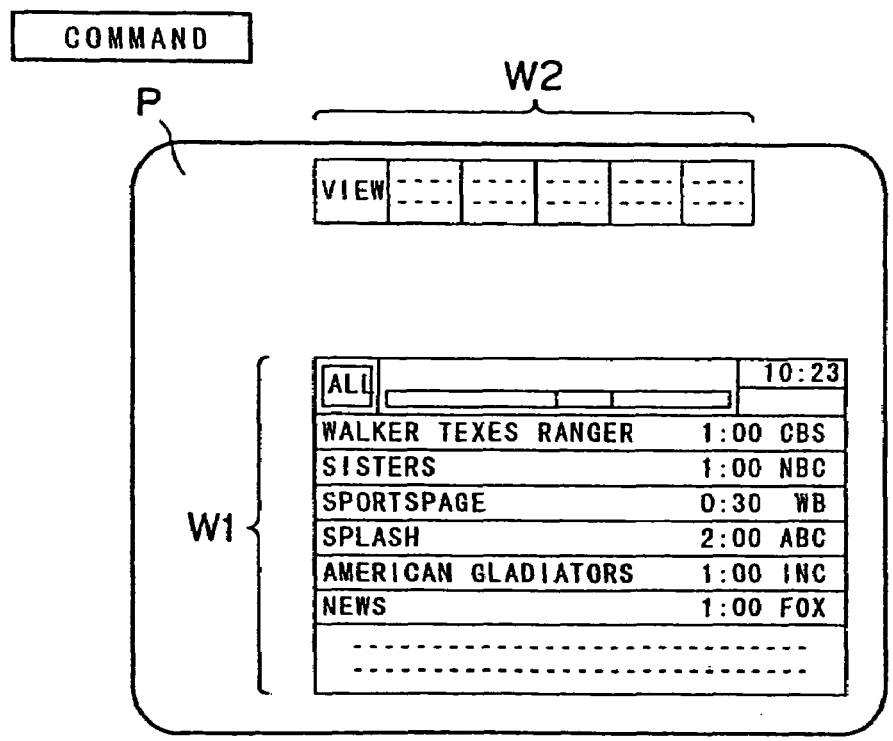

In this case, the user manipulates the up key 13A-1 or the down key 13A-2 out of the cursor keys to thereby place the color bar CB in the column of program "Splash" as shown in FIG. 10C. And if the command key 13-2 is manipulated in this state, a COMMAND window W2 is displayed as shown in FIG. 10D. Since the operation has been shifted from the MAIN mode to the COMMAND mode at this time, the COMMAND window W2 is rendered active.

Under the display condition of FIG. 10D, the user manipulates, if necessary, the command key 13-2 to set command_1 mode. And then the user places the cursor on a command item of [view], which corresponds to command No. 1_0, by manipulating the right key 13A-3 or the left key 13A-4 (in this case, the cursor position is denoted with white characters on a color background). If the EXE key 13A-5 is manipulated in this state, the program "Splash" selected on the EPN picture by the user is settled to be thereby displayed. Actually, an image of the program "Splash" is displayed as a selected picture P shown in FIG. 10E. In this case, the operation is naturally shifted to the normal mode due to execution of the command item [view].

If a necessary manipulation is performed according to the same procedure as in FIG. 10 after "All (This) tape navigate" mode is set in a state where a tape cassette containing video-recorded data as tape library data is loaded in the VTR, then it is possible to search and reproduce the recorded program selected by the VTR 11. Such reproduction control is possible by detecting a signal which is recorded on the control track of a magnetic tape T and indicates the recording start position of the recorded program.

FIGS. 11A to 11F illustrate, together with displayed images, manipulation examples to be executed when the user reserves recording of a desired program with reference to a program table displayed in an EPN picture.

Figure 11A:
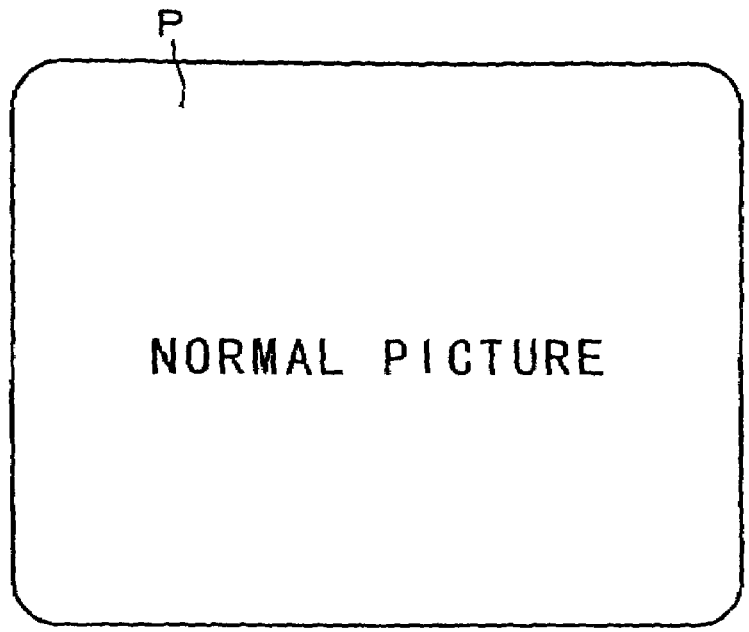
FIGS. 11A to 11F are explanatory diagrams showing other examples of manipulations in the EPN.
Figure 11B:
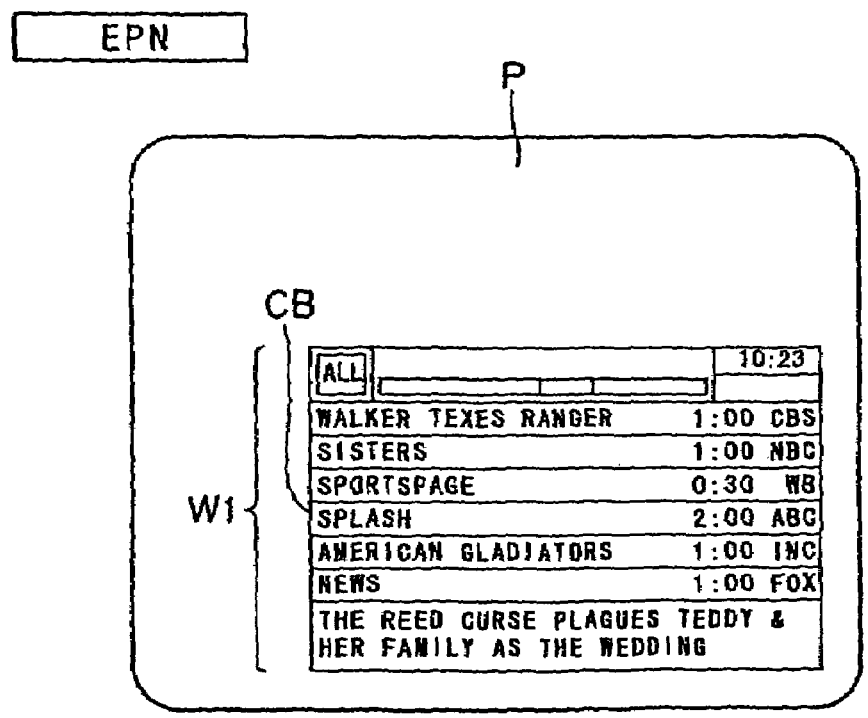

Similarly to the foregoing case from FIG. 10A to FIG. 10B, the operation is shifted to the MAIN mode to display a MAIN window by a manipulation of the EPN key 13-1 during display of a picture P in the normal mode of FIG. 11A, and a desired program is selectable by manipulating cursor keys in this state.

Suppose here that the user wants to record a program "Splash" with reservation. Differing from the foregoing case of FIG. 10 where the program "Splash" is being broadcast at the current time, it is assumed in FIG. 11 that this program is not being broadcast now and is scheduled to be broadcast later.

Figure 11C:
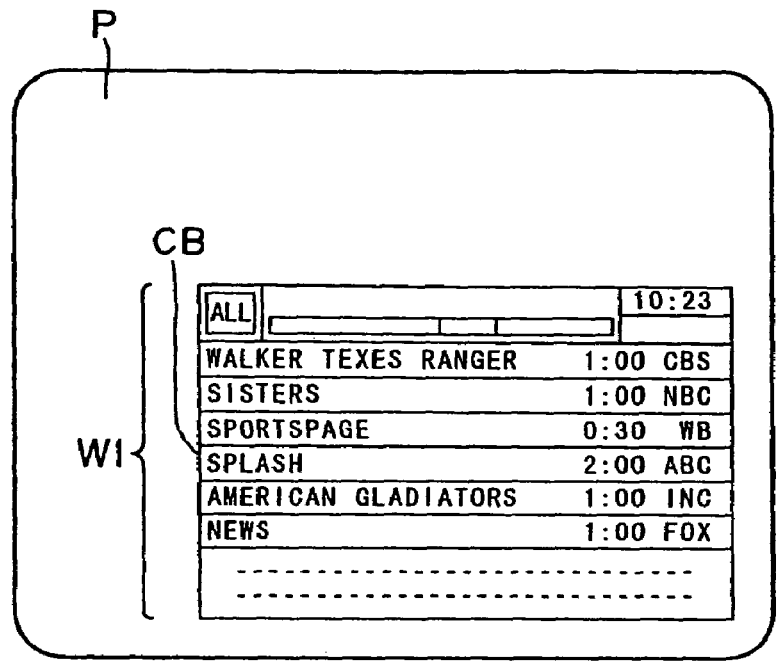

First, the user places a color bar CB in the column of the program "Splash" as shown in FIG. 11C by manipulating the up key 13A-1 or the down key 13A-2. And if the command key 13-2 is manipulated in this state, a COMMAND window W2 is displayed as shown in FIG. 11D.

Figure 11D:
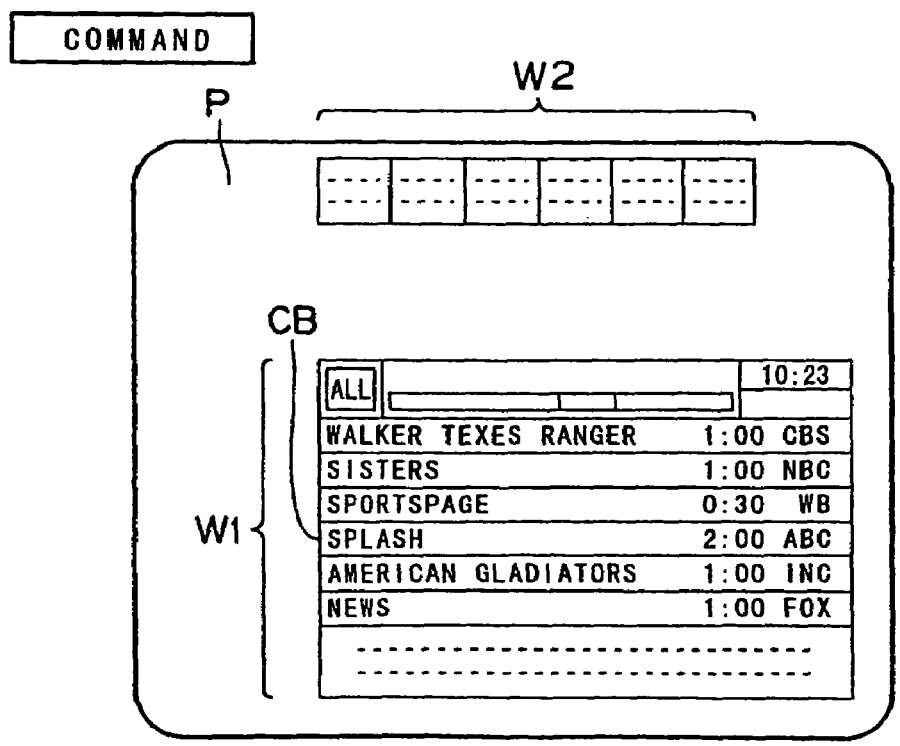

Under the display condition of FIG. 11D, the user manipulates, if necessary, the command key 13-2 to set command_1 mode. And then the user places the cursor on a command item of [rec], which corresponds to command No. 1_1, by manipulating the right key 13A-3 or the left key 13A-4.

Figure 11E:
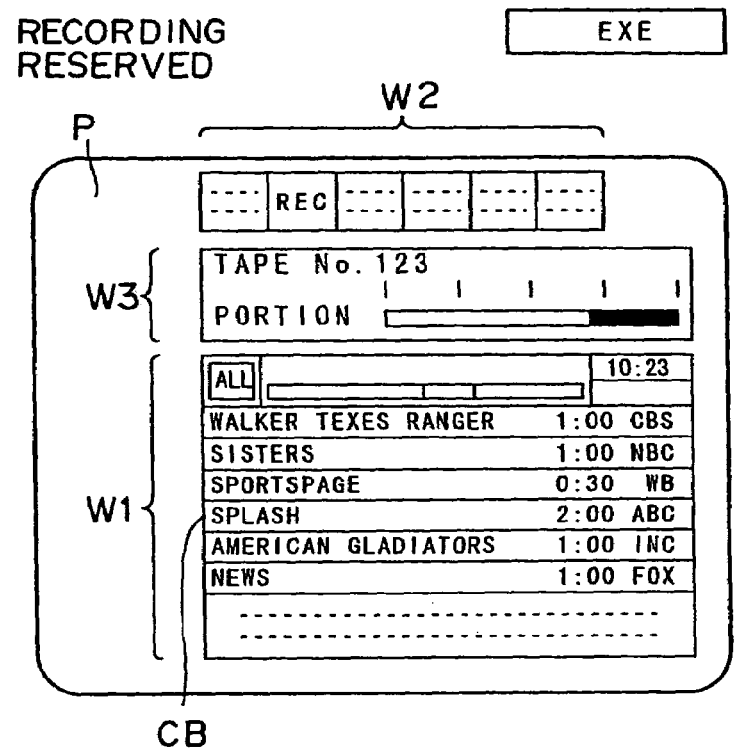

If the user manipulates the EXE key 13A-5 in this state, an INPUT window W3 corresponding to the command item [rec] is displayed (i.e., the operation is shifted to the INPUT mode where the INPUT window W3 is rendered active), as shown in FIG. 11E. Then the user executes predetermined setting in the INPUT window W3 for reserved recording of the desired program.

And is the EXE key 13A-5 is manipulated in the INPUT mode, the operation is shifted to the COMMAND mode, and then reserved recording of the program "Splash" selected on the EPN picture by the user is executed.

Figure 11F:
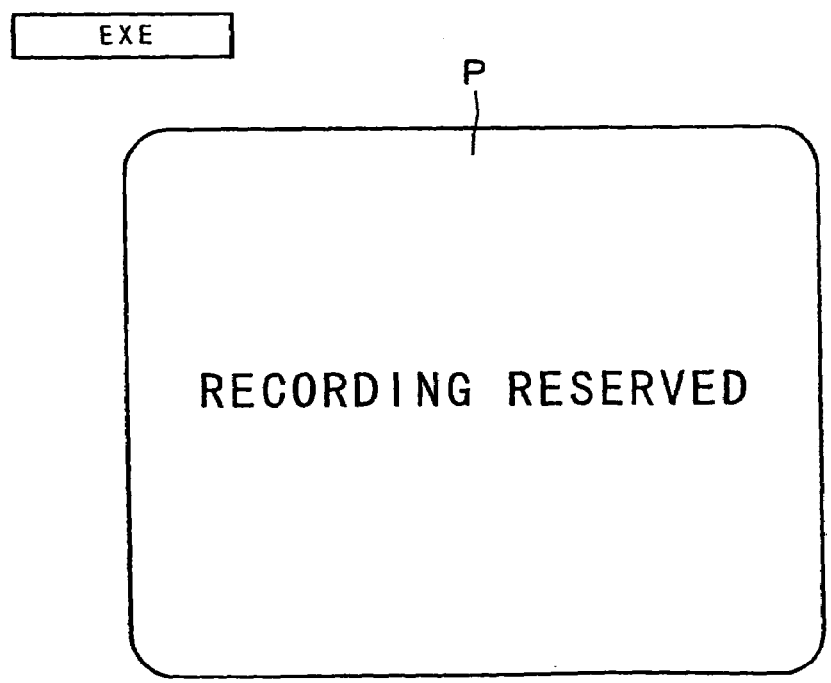

In this case, actually, an image in the COMMAND mode is displayed as a selected picture P shown in FIG. 11F.

7. Explanation of Processing Operations

Referring now to flowcharts of FIGS. 12 to 15, an explanation will be given on the processing executed to realize control actions in response to manipulations of the keys (shown in FIG. 2) in each mode. The system controller 9 executes this processing operation.

Figure 12:
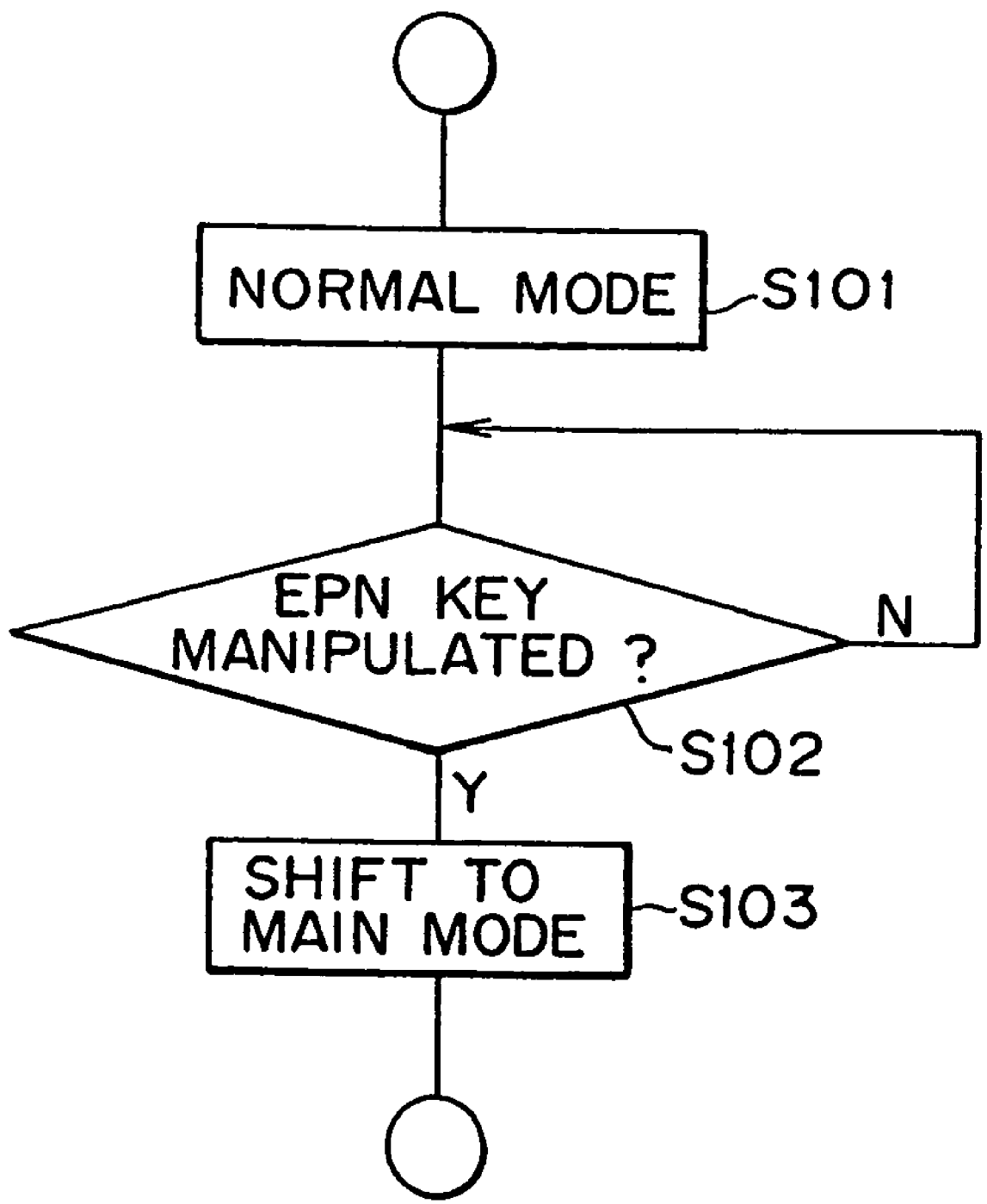
FIG. 12 is a flowchart showing a processing operation to display the EPN.

FIG. 12 shows a processing operation in the normal mode. In this routine, when the normal mode is set at step S101, a manipulation of the EPN key 13-1 is waited at step S102. And upon decision signifying a manipulation of the EPN key 13-1, the operation proceeds to step S103 to be shifted to the MAIN mode.

Figure 13:
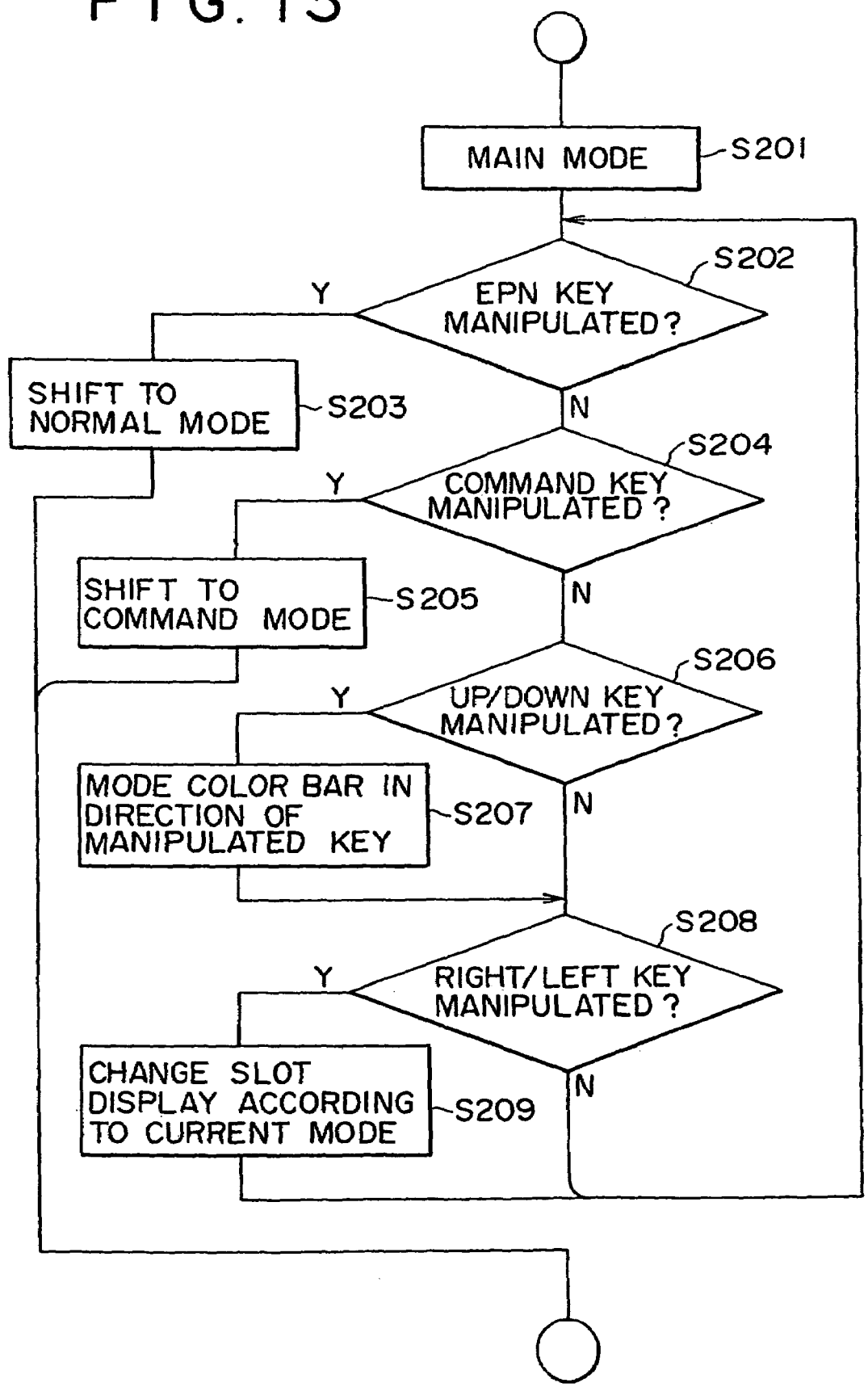
FIG. 13 is a flowchart showing another processing operation to display the EPN.

FIG. 13 shows a processing operation in the MAIN mode selected as an EPN mode.

First, upon shift to the MAIN mode at step S201, a decision is made at step S202 as to whether the EPN key 13-1 has been manipulated or not. And if the result of this decision signifies a manipulation of the EPN key 13-1, the operation proceeds to step S203 to be shifted to the normal mode, so that the operation passes through this routine.

Meanwhile, if the result of the decision at step S202 signifies no manipulation of the EPN key, the operation proceeds to step S204, where another decision is made as to whether the command key has been manipulated or not. And if the result of this decision signifies a manipulation of the command key 13-2, the operation proceeds to the COMMAND mode. However, when the result of the above decision signifies no manipulation of the command key, the operation proceeds to step S206.

At step S206, a decision is made as to whether the up key 13A-1 or the down key 13A-2 has been manipulated or not. And if the result of this decision signifies a manipulation of the up key 13A-1 or the down key 13A-2, the operation proceeds to step S207, where a color bar (see FIG. 6) placed in the listing area A4 is moved upward or downward under control, and then the operation proceeds to step S208. Meanwhile, if the result of the decision at step S206 signifies no manipulation of the up key 13A-1 or the down key 13A-2, the operation proceeds directly to step S208.

At step S208, a decision is made as to whether the right key 13A-3 or the left key 13A-4 has been manipulated or not. And the result of this decision signifies no manipulation or the right key 13A-3 or the left key 13A-4, the operation returns to the process of step S202. Meanwhile, if the result of the above decision signifies a manipulation of the right key 13A-3 or the left key 13A-4, the operation proceeds to step S209, where the display is changed (see FIG. 7) by the slot function (see FIG. 7) according to the current All (This) channel navigate mode or "All (This) tape navigate" mode. And thereafter the operation returns to step S202.

Figure 14:
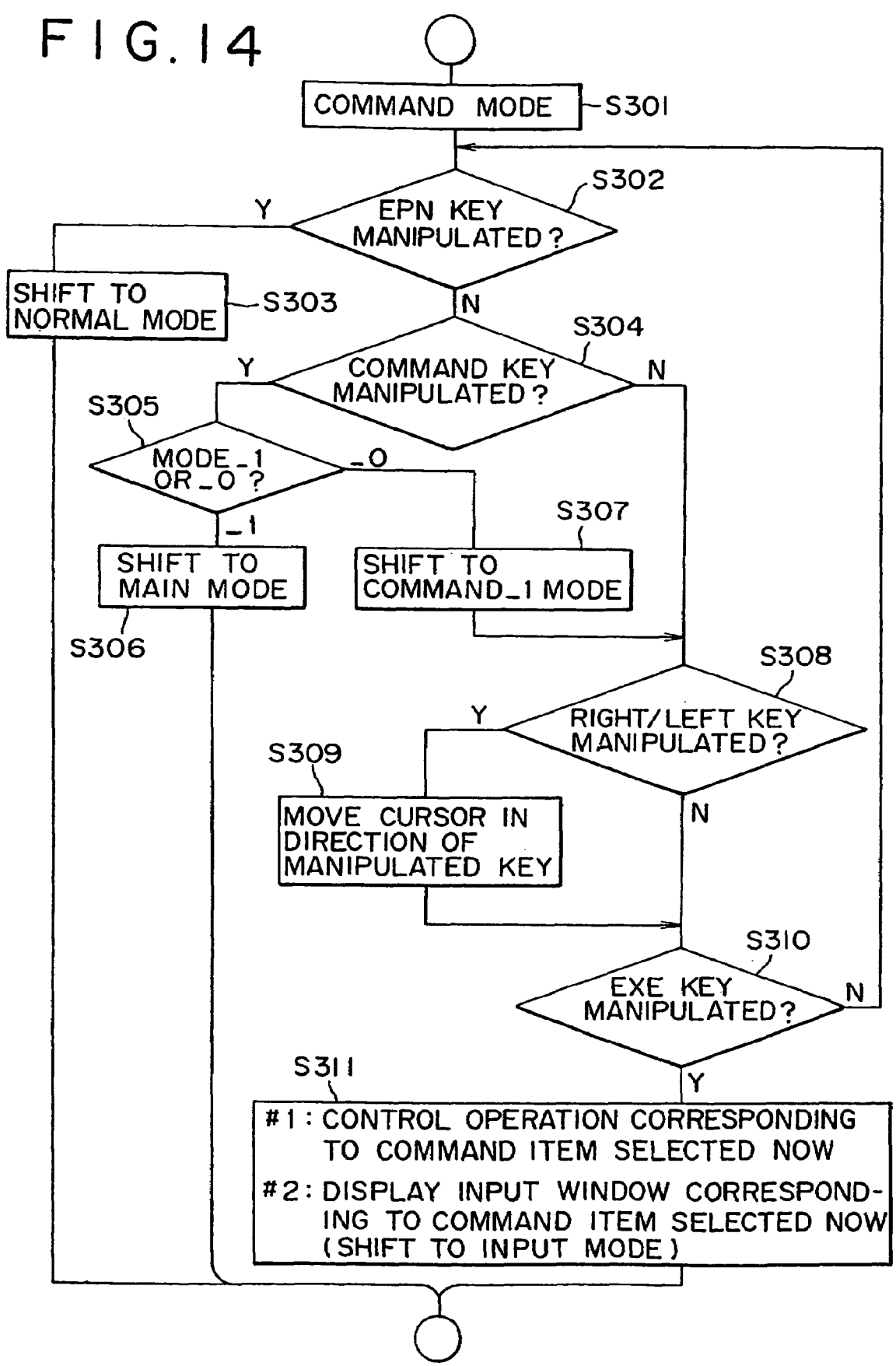
FIG. 14 is a flowchart showing a further processing operation to display the EPN.

FIG. 14 shows a processing operation in the COMMAND mode selected as an EPN mode.

First, upon shift to the COMMAND mode at step S301, a decision is made at step S302 as to whether the EPN key 13-1 has been manipulated or not. And if the result of this decision signifies a manipulation of the EPN key, the operation proceeds to step S303 to be shifted to the normal mode. However, if the result of the above decision signifies no manipulation of the EPN key, the operation proceeds to step S304.

At step S304, another decision is made as to whether the command key has been manipulated or not. And if the result of this decision signifies a manipulation of the command key, the processes of steps S305, S306 and S307 are executed for transition of the mode described with reference to FIG. 8C.

Meanwhile, if the result of the decision at step S304 signifies no manipulation of the command key, the operation proceeds to step S308, where a decision is made as to whether the right key 13A-3 or the left key 13A-4 has been manipulated or not. And if the result of this decision signifies a manipulation of the right key 13A-3 or the left key 13A-4, the display is so controlled as to move the cursor between the display areas in accordance with the direction of the key manipulation, and thereafter the operation proceeds to step S310. However, if the result of the above decision signifies no manipulation of the right key 13A-3 or the left key 13A-4, the operation proceeds directly to S310.

At step S310, a decision is made as to whether the EXE key 13A-5 has been manipulated or not. And if the result of this decision signifies no manipulation of the EXE key, the operation returns to step S302. However, if the result of the above decision signifies a manipulation of the EXE key 13A-5, the operation proceeds to step S311.

At step S311, either a process #1 or a process #2 is executed in accordance with the kind of the selected command item.

Figure 10E:
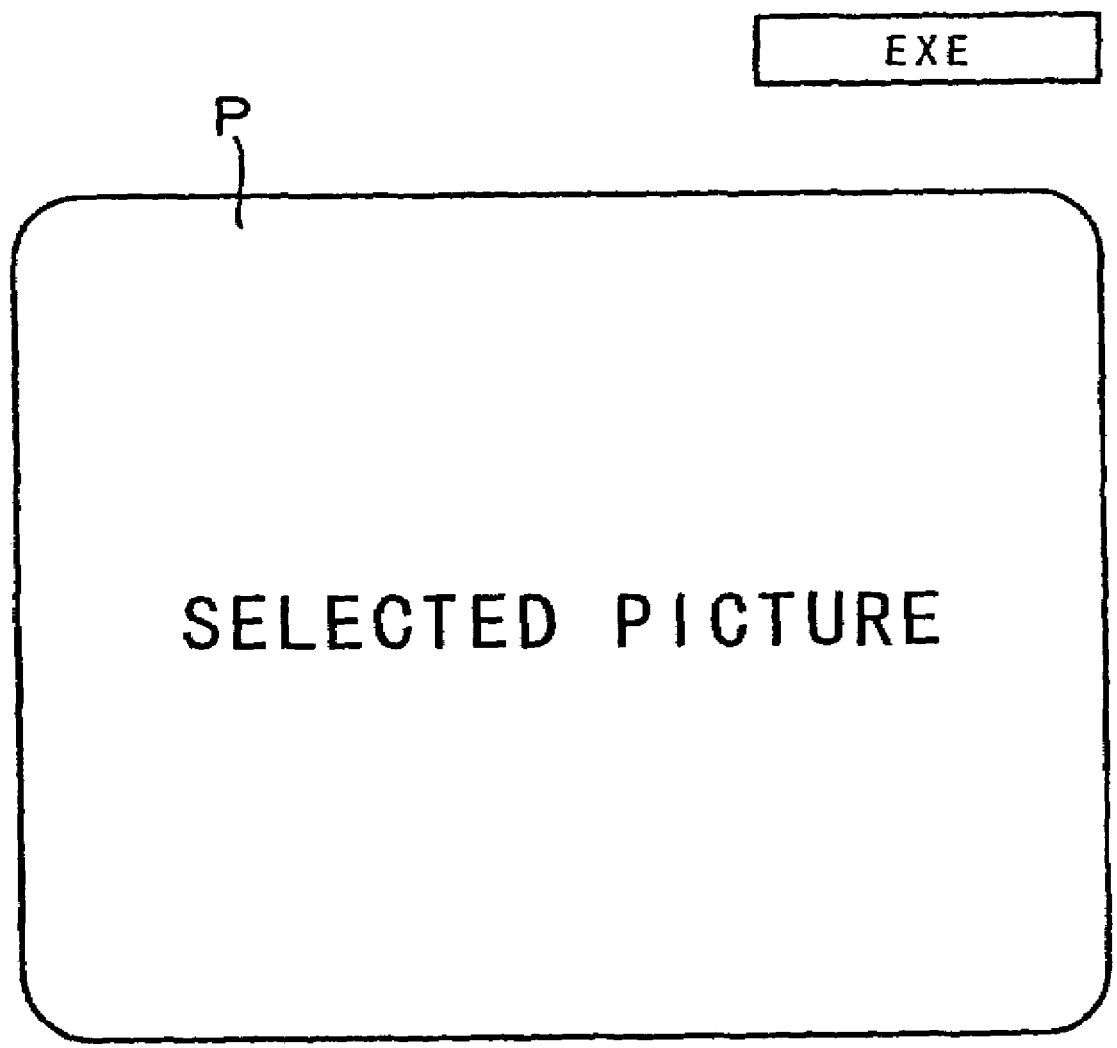

The process #1 is executed to perform direct control of the operation conforming to the function of the command item being selected currently. More specifically, for example, this process corresponds to a control action for displaying a selected program, as shown in FIGS. 10D to 10E, by selecting a command item [view] in the COMMAND window W2 and manipulating the EXE key.

Meanwhile the process #2 is executed, after shift to the INPUT mode, to display an INPUT window conforming to the command item being selected currently. More specifically, this process corresponds to a display operation shown in FIGS. 10D to 10E.

Figure 15:
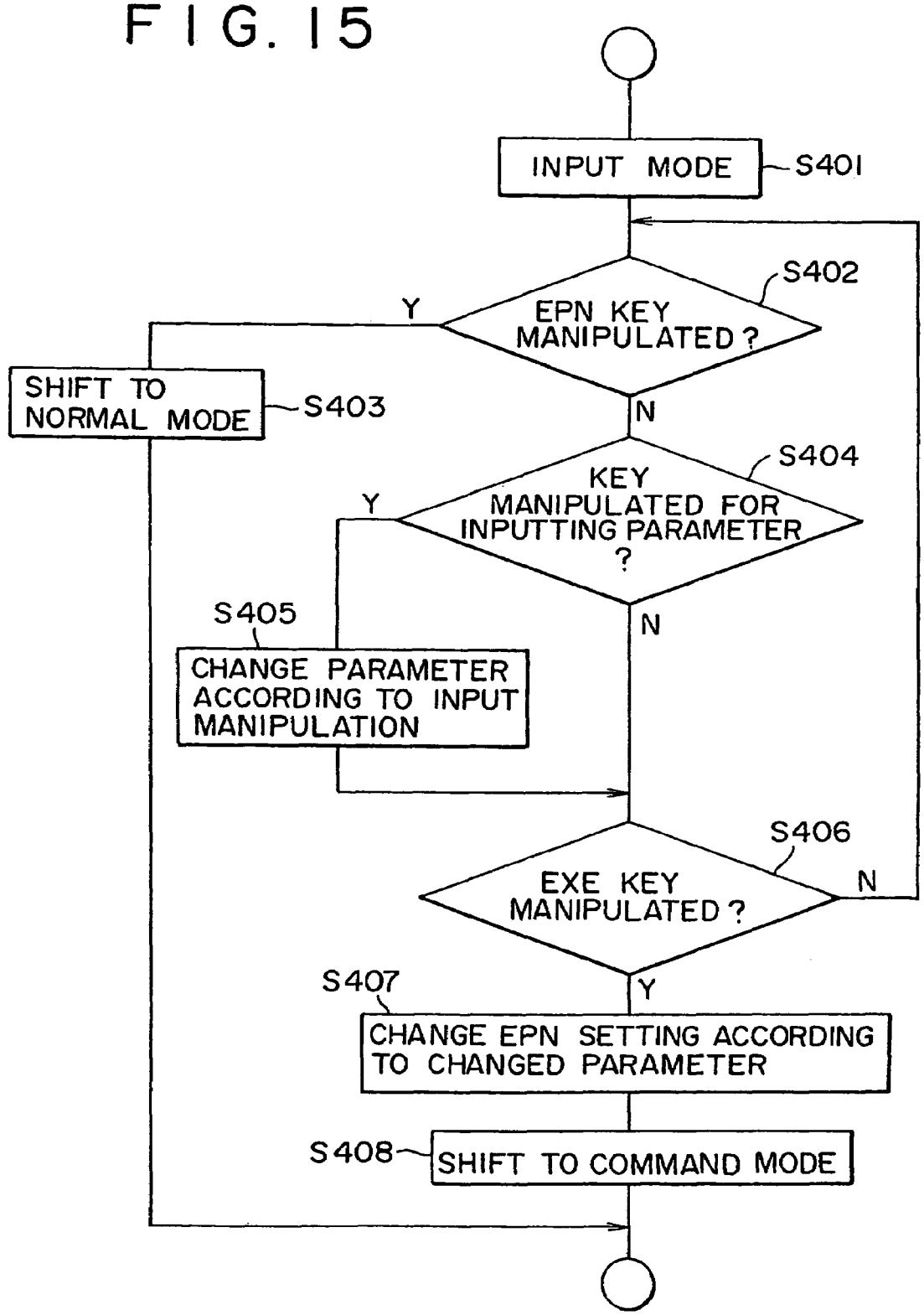
FIG. 15 is a flowchart showing an even further processing operation to display the EPN.

FIG. 15 shows another processing operation in the INPUT mode selected as an EPN mode.

First, upon shift to the INPUT mode at step S401, a decision is made at step S402 as to whether the EPN key 13-1 has been manipulated or not. And if the result of this decision signifies a manipulation of the EPN key, the operation proceeds to step S403 to be shifted to the normal mode. However, if the result of the above decision signifies no manipulation of the EPN key, the operation proceeds to step S404.

At step S404, another decision is made as to whether any entry has been inputted by a manipulation of the predetermined key to change the parameter. And if the result of this decision signifies a manipulation of the predetermined key, the operation proceeds to step S405, where a process of changing the parameter is executed in accordance with the key entry manipulation. And thereafter the operation proceeds to step S406. Meanwhile, if the result of the above decision signifies no manipulation of the key for changing the parameter, the operation proceeds directly to step S406.

At step S406, a decision is made as to whether the EXE key has been manipulated or not. And if the result of this decision signifies no manipulation of the EXE key, the operation returns to step S402. However, if the result of the above decision signifies a manipulation of the EXE key, the operation proceeds to step S407.

Subsequently at step S407, if there is any parameter changed by the process at step S405, the EPN setting is changed in accordance with the parameter. Thereafter the operation is shifted to the COMMAND mode at step S408, and then passes through this routine.

Thus, as explained above, the present invention is so constituted as to be capable of displaying, in accordance with each mode as an electrical program guide, program information relative to broadcast programs and also recorded program information relative to broadcast programs recorded in tape cassettes, so that a user is enabled to acquire information of both the broadcast programs and the recorded programs in a single electrical program guide system, whereby advantageous effects are achievable in realizing a further useful electrical program guide.

According to such electrical program guide, it is possible to display, in window formats, a program information area (MAIN window), a command area (COMMAND window) and an input area (INPUT window) in the picture on the screen. Consequently, differing from the known conventional display format, there never occurs an inconvenience that the entire contents of the displayed electrical program guide are switched wholly with each change of the mode, hence ensuring enhanced convenience in use.

Besides the above, when executing various control actions or input manipulations on the displayed electric program guide in the present invention, every manipulation is possible by the use of cursor keys (four direction indicating keys) for upward, downward, leftward and rightward motion and a small number of keys for transition of mode. Therefore, in case the apparatus is equipped with a multiplicity of functions as an electrical program guide, the user is enabled to perform a proper manipulation conforming to each desired object without any confusion.

Although the present invention has been described hereinabove with reference to the preferred embodiment thereof, it is to be understood that the invention is not limited to such embodiment alone, and a variety of modifications may be contrived as well. For example, the concrete display formats of windows in the EPN mode or the display items defined in each window may be modified in compliance with actual conditions of usage.

The scope of the invention, therefore, is to be determined solely by the appended claims.

What is claimed is:

1. An apparatus for controlling display of an electrical program guide, comprising:
    a broadcast program information storage unit for storing, as broadcast program information, the information relative to broadcast programs currently broadcast and broadcast programs scheduled to be broadcast;
    a recorded program information storage unit for storing, as recorded program information, the information relative to the broadcast programs recorded in recording media, said recorded program information including at least a name of each recorded broadcast program and a designation of the recording media the broadcast program is recorded on;
    a display control unit capable of displaying, as an electrical program guide to provide the program related information, the program information relative to both the broadcast programs and the recorded programs on the basis of the broadcast program information stored in said broadcast program information storage unit and also the recorded program information stored in said recorded program information storage unit; and
    a manipulation unit for controlling manipulation of the displayed picture of said electrical program guide;
    said manipulation unit comprising:
        a first mode change manipulator for selectively changing the operation to an electrical program guide display mode or a normal image display mode; and
        a second mode change manipulator for selectively changing the operation in the electrical program guide display mode to a display mode of broadcast program information or a display mode of recorded program information,
        wherein the display mode of broadcast program information includes (a) a first mode to display information related to all broadcast programs currently broadcast and scheduled to be broadcast and (b) a second mode to display information related to broadcast programs currently broadcast and scheduled to be broadcast for only a selected channel.

2. The apparatus according to claim 1, wherein said display control means is capable of displaying simultaneously, as an electrical program guide, at least a program information area in the form of a window to display the program information, a command area in the form of a window to display items for selecting a manipulation command relative to said program guide, and an input area in the form of a window to display items for inputting a required parameter corresponding to the selected manipulation command.

3. The apparatus of claim 1 wherein said manipulation unit further comprises a third mode change manipulator selectively changing the operation to a mode where a manipulation on a command area is rendered active, or to a mode where a manipulation on an input area is rendered active; and
    a cursor motion manipulator adapted for manipulation relative to at least the motion of a cursor or setting of parameters on a program information area, the command area and the input area.

4. A method of controlling the display of an electrical program guide comprising the steps of:
    storing, as broadcast program information, the information relative to broadcast programs currently broadcast and broadcast programs scheduled to be broadcast;
    storing, as recorded program information, the information relative to the broadcast programs recorded in recording media, said recorded program information including at least a name of each recorded broadcast program and a designation of the recording media the broadcast program is recorded on;
    displaying, as an electrical program guide to provide as program related information, the program information relative to both the broadcast programs and the recorded programs on the basis of the stored broadcast program information and also the stored recorded program information; and
    selectively changing the operation of the display to an electrical program guide display mode or a normal image display mode in response to operation by a manipulation unit, and selectively changing the operation to display broadcast program information or recorded program information in the electrical program guide display mode,
    wherein the display mode of broadcast program information includes (a) a first mode to display information related to all broadcast programs currently broadcast and scheduled to be broadcast and (b) a second mode to display information related to broadcast programs currently broadcast and scheduled to be broadcast for only a selected channel.

5. The method according to claim 4, further comprising the steps of displaying simultaneously, as an electrical program guide, at least a program information area in the form of a window to display the program information, a command area in the form of a window to display items for selecting a manipulation command relative to said program guide, and an input area in the form of a window to display items for inputting a required parameter corresponding to the selected manipulation command.

6. The method according to claim 4, further comprising the steps of selectively changing the operation to a mode where a manipulation on a command area is rendered active, or to a mode where a manipulation on an input area is rendered active; and manipulating a cursor relative to at least the motion of the cursor or setting of parameters on a program information area, the command area and the input area.

* * * * *

UNITED STATES PATENT AND TRADEMARK OFFICE
CERTIFICATE OF CORRECTION

| | |
|---|---|
| PATENT NO. | : 7,624,345 B2 |
| APPLICATION NO. | : 11/087131 |
| DATED | : November 24, 2009 |
| INVENTOR(S) | : Nishina et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Fourteenth Day of December, 2010

David J. Kappos
*Director of the United States Patent and Trademark Office*